US012776278B2

(12) United States Patent
Choi et al.

(10) Patent No.: US 12,776,278 B2
(45) Date of Patent: Oct. 27, 2026

(54) DISPLAY APPARATUS

(71) Applicant: LG Display Co., Ltd., Seoul (KR)

(72) Inventors: DongHo Choi, Seoul (KR); DaHye Shim, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 19/067,156

(22) Filed: Feb. 28, 2025

(65) Prior Publication Data

US 2025/0279065 A1 Sep. 4, 2025

(30) Foreign Application Priority Data

Feb. 29, 2024 (KR) ........................ 10-2024-0030315

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0819* (2013.01); *G09G 2300/0842* (2013.01); *G09G 2300/0861* (2013.01); *G09G 2310/0283* (2013.01); *G09G 2310/0286* (2013.01); *G09G 2330/023* (2013.01)

(58) Field of Classification Search
CPC ......... G09G 2310/0286; G09G 3/3677; G09G 2310/0283; G09G 2310/08; G09G 2310/0267; G09G 3/3266; G09G 3/3648; G09G 3/3674; G09G 3/3688; G09G 2330/021; G09G 2310/061; G09G 2320/0242; G09G 5/02; G09G 3/20; G09G 2300/0408; G09G 2300/0426; Y02B 70/10; Y02B 20/40; Y02B 20/00
See application file for complete search history.

(56) References Cited

U.S. PATENT DOCUMENTS

2011/0164003 A1* 7/2011 Kobayashi ............... G09G 3/20 345/55
2016/0372070 A1* 12/2016 Hu ......................... G11C 19/28
2020/0082765 A1* 3/2020 Zhang .................. G09G 3/3266
2021/0035488 A1* 2/2021 Seo ........................ G09G 3/325
2023/0335064 A1* 10/2023 Her ...................... G09G 3/3266

FOREIGN PATENT DOCUMENTS

KR 10-1749756 B1 6/2017
KR 10-2020932 B1 9/2019
KR 10-2022-0096586 A 7/2022

* cited by examiner

*Primary Examiner* — Sujit Shah
(74) *Attorney, Agent, or Firm* — Birch, Stewart, Kolasch & Birch, LLP

(57) ABSTRACT

A display apparatus can include a display panel having an active area in which a plurality of pixels is disposed and a non-active area which encloses the active area, and a gate driver configured to output an output signal in a forward direction or a backward direction according to a scan mode. The gate driver includes a plurality of stages and a scan direction controller which is connected between the plurality of stages to transmit the output signal output from an n-th stage to any one of an n−1-th stage or an n+1-th stage according to the scan mode.

10 Claims, 14 Drawing Sheets

DISPLAY APPARATUS

CROSS-REFERENCE TO RELATED APPLICATIONS

This application claims priority to Korean Patent Application No. 10-2024-0030315 filed on Feb. 29, 2024, in the Korean Intellectual Property Office, the entire contents of which is hereby expressly incorporated by reference into the present application.

BACKGROUND

Field

The present disclosure relates to a display apparatus.

Discussion of the Related Art

As technology in modern society develops, display apparatuses are used in various ways to provide information to users. The display apparatuses include not only electronic signs which simply transmit visual information in one direction, but also various electronic devices which require higher level of technology to check a user's input and provide information in response to the checked input.

A representative display apparatus can include a liquid crystal display apparatus (LCD), a field emission display apparatus (FED), an electro-wetting display apparatus (EWD), an organic light emitting display apparatus (OLED), and the like.

Among them, the organic light emitting display apparatus is a self-emitting display apparatus so that a separate light source is not necessary, which is different from the liquid crystal display apparatus. Therefore, the organic light emitting display apparatus can be manufactured to have a light weight and a small thickness. Further, since the organic light emitting display apparatus is advantageous not only in terms of power consumption due to the low voltage driving, but also in terms of color implementation, a response speed, a viewing angle, and a contrast ratio (CR), it is expected to be utilized in various fields.

SUMMARY OF THE DISCLOSURE

An object to be achieved by the present disclosure is to provide a display apparatus which can be driven in both directions, meaning a driving of the display apparatus in either a forward scan mode or a backward scan mode.

Another object to be achieved by the present disclosure is to provide a display apparatus which has more than one active area in which images are displayed, whereas can be driven separately.

Objects of the present disclosure are not limited to the above-mentioned objects, and other objects, which are not mentioned above, can be clearly understood by those skilled in the art from the following descriptions.

A display apparatus according to an example embodiment of the present disclosure includes a display panel including an active area in which a plurality of pixels is disposed and a non-active area which encloses the active area, and a gate driver configured to output an output signal in a forward direction or a backward direction according to a scan mode, where the gate driver includes a plurality of stages and a scan direction controller which is connected between the plurality of stages to transmit the output signal output from an n-th stage (also referred to herein as an nth stage) to any one of an n−1-th stage (also referred to herein as an (n−1)th stage) or an n+1-th stage (also referred to herein as an (n+1)th stage) according to the scan mode.

Other detailed matters of the example embodiments are included in the detailed description and the drawings.

According to aspects of the present disclosure, a scan direction controller is disposed between stages to select a driving direction of a gate driver and output a scan signal in a forward direction and a backward direction to be driven in both directions.

According to aspects of the present disclosure, an active area is divided and the operation is separately performed for every active area.

The effects according to aspects of the present disclosure are not limited to the contents exemplified above, and more various effects are included in the present disclosure.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENTS

Figure 1:
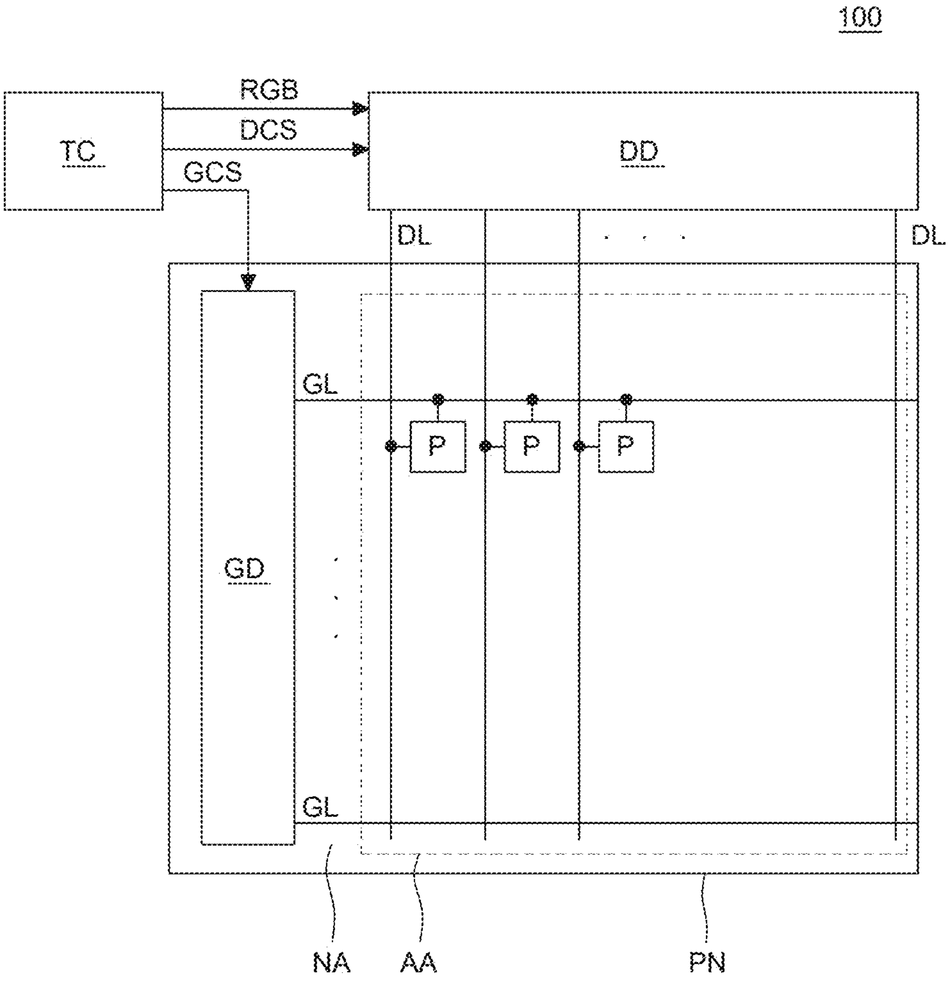
FIG. 1 is a block diagram of a display apparatus according to an example embodiment of the present disclosure.

Advantages and characteristics of the present disclosure and a method of achieving the advantages and characteristics will be clear by referring to example embodiments described below in detail together with the accompanying drawings. However, the present disclosure is not limited to the example embodiments disclosed herein but will be implemented in various forms. The example embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the example embodiments of the present disclosure are merely examples, and the present disclosure is not limited thereto. Like reference numerals generally denote like elements throughout the disclosure. Further, in the following description of the present disclosure, a detailed explanation of known related technologies can be omitted to avoid unnecessarily obscuring the subject matter of the present disclosure. The terms such as "including," "having," and "consist of" used herein are generally intended to allow other components to be added unless the terms are used with the term "only". Any references to singular can include plural unless expressly stated otherwise.

In describing components of the example embodiment of the present disclosure, terminologies such as first, second, A, B, (a), (b), and the like can be used. These terminologies are used to distinguish a component from the other component, but a nature, an order, or the number of the components is not limited by the terminology. When a component is "linked", "coupled", or "connected" to another component, the component can be directly linked or connected to the other component. However, unless specifically stated otherwise, it should be understood that a third component can be interposed between the components which can be indirectly linked or connected.

When the position relation between two parts is described using the terms such as "on", "above", "below", and "next", one or more parts can be positioned between the two parts unless the terms are used with the term "immediately" or "directly".

Although the terms "first", "second", and the like are used for describing various components, these components are not confined by these terms. These terms are merely used for distinguishing one component from the other components, and may not define order or sequence. Therefore, a first component to be mentioned below can be a second component in a technical concept of the present disclosure. In addition, the term "can" fully encompasses all the meanings and coverages of the term "may."

The features of various embodiments of the present disclosure can be partially or entirely adhered to or combined with each other and can be interlocked and operated in technically various ways, and the embodiments can be carried out independently of or in association with each other.

The following embodiments will be described focusing on the organic light emitting display device. However, embodiments of the present disclosure are not limited to organic light emitting display devices and can be applied to various electroluminescent displays. For example, the electroluminescent display apparatus can use an organic light emitting diode (OLED) display apparatus, a quantum dot (QD) light emitting diode display apparatus, or an inorganic light emitting diode display apparatus.

Hereinafter, example embodiments of the present disclosure will be described in detail with reference to accompanying drawings. All the components of each display apparatus according to all embodiments of the present disclosure are operatively coupled and configured.

FIG. 1 is a block diagram of a display apparatus according to an example embodiment of the present disclosure.

Referring to FIG. 1, a display apparatus 100 according to the example embodiment of the present disclosure can include a display panel PN, a timing controller TC, a data driver DD, and a gate driver GD.

The display panel PN can include an active area AA (or display area) in which an image is displayed and a non-active area NA (or non-display area) which is disposed at the outside of the active area AA. The non-active area NA can surround the active area AA entirely or only in part(s). Various signal lines and a gate driver GD are disposed in the non-active area NA.

In the active area AA, a plurality of pixels P can be disposed to display images.

In the active area AA, a plurality of gate lines GL disposed in a first direction and a plurality of data lines DL disposed in a second direction which is different from the first direction can be disposed. The plurality of gate lines GL and the plurality of data lines DL can intersect. At each intersection of a gate line GL and a data line DL, one pixel may be disposed. The plurality of pixels P can be disposed in a matrix.

The plurality of pixels P can be electrically connected to the plurality of gate lines GL and the plurality of data lines DL. Therefore, a gate signal and a data signal can be applied to each pixel P through the gate lines GL and the data lines DL. Each pixel P implements a gray scale by the gate signal and the data signal to display the image in the active area AA.

Each of the plurality of pixels P can be any one of a red pixel, a green pixel, a blue pixel, and a white pixel. The red pixel, the green pixel, the blue pixel, and the white pixel can configure one unit pixel to implement colors, but the example embodiments of the present disclosure are not limited thereto. Colors implemented in the unit pixel can be set according to an emission ratio of the red pixel, the green pixel, the blue pixel, and the white pixel. When a white pixel can be omitted in the unit pixel. One data line DL and one gate line GL can be connected to each of the plurality of pixels P.

A plurality of pixel lines can be provided in the active area AA. On each pixel line, a plurality of pixels P which is adjacent in a row direction and is commonly connected to gate lines GL can be disposed. Here, the pixel line can be a set of pixels corresponding to one line connected to one gate line GL disposed in the row direction.

The timing controller TC can transmit an input image signal RGB received from a host system to the data driver DD.

The timing controller TC can generate a control signal for controlling an operation timing of the gate driver GD and the data driver DD using a timing signal, such as a clock signal, a horizontal synchronization signal, a vertical synchronization signal, and a data enable signal which are received together with image data. Here, the horizontal synchronization signal can be a signal which represents a time taken to display one horizontal line of a screen. The vertical synchronization signal can be a signal which represents a time taken to display a screen of one frame. The data enable signal can be a signal which represents a period of supplying a data signal to a pixel P defined in the display panel PN.

For example, the timing controller TC is applied with a timing signal to output a gate control signal to the gate driver GD and output a data control signal to the data driver DD.

The data driver DD is applied with the data control signal to output a data signal to the data line DL.

For example, the data driver DD generates a sampling signal in accordance with the data control signal and latches image data in accordance with a sampling signal to be converted into a data signal and then can supply the data signal to the data line DL in response to a source output enable (SOE) signal.

The data driver DD is connected to a bonding pad of the display panel PN in a chip on glass (COG) manner or can be directly disposed on the display panel PN. In some cases, the data driver can be disposed to be integrated with the display panel PN, but the example embodiments of the present disclosure are not limited thereto. Further, the data driver DD can be disposed by a chip on film (COF) manner.

The gate driver GD can generate a scan signal and an emission signal (or an emission control signal) based on the gate control signal.

The gate driver GD can include a scan driver and an emission signal driver. The scan driver generates a scan signal in a row sequential manner to drive at least one scan line connected to each pixel row to supply the scan signal to the scan lines. The emission signal driver generates an emission signal in a row sequential manner to drive at least one emission signal line connected to each pixel row to supply the emission signal to the emission signal lines.

Figure 2:
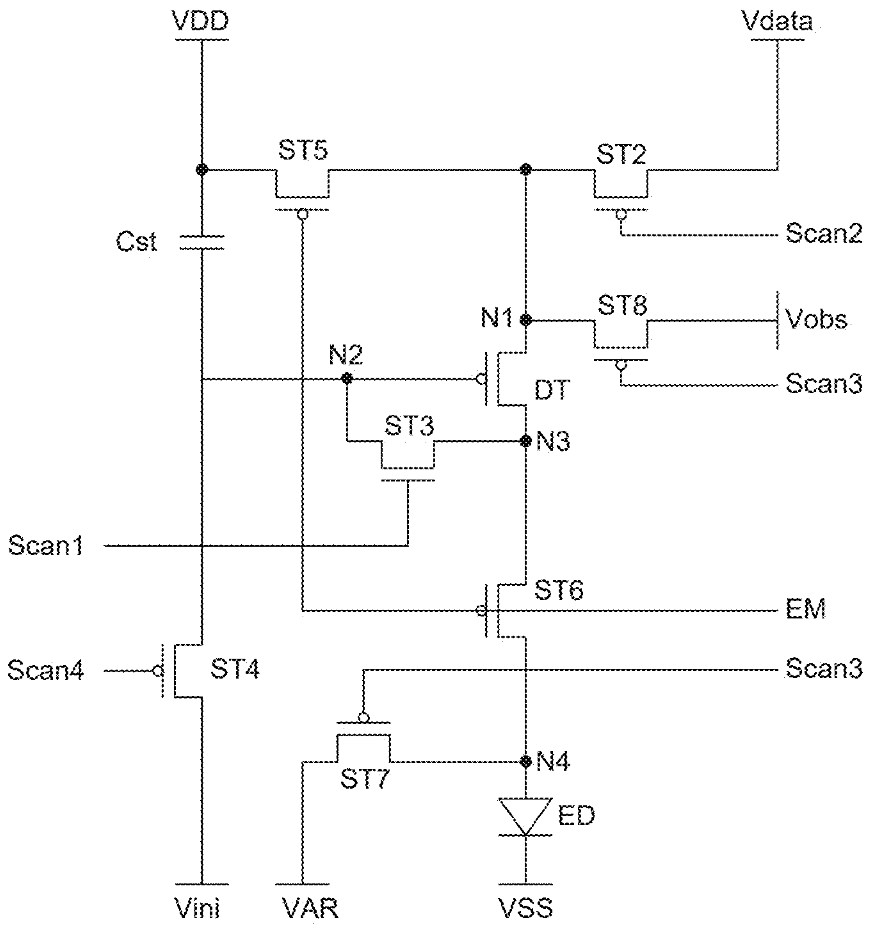
FIG. 2 is an example circuit diagram of a display apparatus according to an example embodiment of the present disclosure.

FIG. 2 is an example circuit diagram of a display apparatus according to an example embodiment of the present disclosure.

Referring to FIG. 2, a circuit of the pixel P can include a light emitting diode ED, a driving transistor DT, a second switching transistor ST2, a third switching transistor ST3, a fourth switching transistor ST4, a fifth switching transistor ST5, a sixth switching transistor ST6, a seventh switching transistor ST7, an eighth switching transistor ST8, and a storage capacitor Cst. However, the example embodiments of the present disclosure are not limited thereto.

The light emitting diode ED can emit light by a driving current supplied from the driving transistor DT. An anode electrode of the light emitting diode ED is connected to a fourth node N4 and a cathode electrode of the light emitting diode ED can be connected to a low potential power line to which a low potential power voltage VSS is supplied.

The driving transistor DT can control a driving current applied to the light emitting diode ED in accordance with a source-gate voltage VSTG. For example, the driving transistor DT can be a p-type MOSFET (PMOS) and can be implemented by a low temperature polycrystalline silicon (LTPS) transistor, but the example embodiments of the present disclosure are not limited thereto. As another example, the driving transistor DT can be an n-type MOSFET (NMOS) and can be implemented by an oxide transistor. The oxide transistor can be configured by one of oxide semiconductors, such as indium oxide, gallium oxide, zinc oxide, or IGZO, but the example embodiments of the present disclosure are not limited thereto. A source electrode of the driving transistor DT is connected to a first node N1, a gate electrode is connected to a second node N2, and a drain electrode can be connected to a third node N3. The driving transistor DT can be referred to as a first switching transistor, but the example embodiments of the present disclosure are not limited thereto.

The second switching transistor ST2 can apply a data signal Vdata supplied from a data line to the first node N1 which is the source electrode of the driving transistor DT. For example, the second switching transistor ST2 can be a p-type MOSFET (PMOS) and can be implemented by a low temperature polycrystalline silicon (LTPS) transistor, but the example embodiments of the present disclosure are not limited thereto. As another example, the second switching transistor ST2 can be an n-type MOSFET (NMOS) and can be implemented by an oxide transistor. The second switching transistor ST2 can include a source electrode connected to the data line, a drain electrode connected to the first node N1, and a gate electrode connected to a second scan signal line which transmits a second scan signal Scan2. Accordingly, the second switching transistor ST2 can apply a data signal Vdata supplied from the data line to the first node N1 which is the source electrode of the driving transistor DT, in response to a low level of the second scan signal Scan2(*n*) which is a turn-on voltage.

The third switching transistor ST3 can diode-connect the gate electrode and the drain electrode of the driving transistor DT. The third switching transistor ST3 can be an n-type MOSFET (NMOS) and can be implemented by an oxide thin film transistor to minimize a leakage current during a turn-off period, but the example embodiments of the present disclosure are not limited thereto. As another example, the third switching transistor ST3 can be a p-type MOSFET (PMOS) and can be configured by an LTPS transistor. The third switching transistor ST3 can include a drain electrode or a source electrode connected to the third node N3, a source electrode or a drain electrode connected to the second node N2, and a gate electrode connected to a first scan signal line which transmits a first scan signal Scan1. Therefore, the third switching transistor ST3 can diode-connect the gate electrode and the drain electrode of the driving transistor DT in response to a high level of the first scan signal Scan1 which is a turn-on voltage.

The fourth switching transistor ST4 applies an initialization voltage Vini to the second node N2 which is the gate electrode of the driving transistor DT. For example, the fourth switching transistor ST4 can be a p-type MOSFET (PMOS) and can be implemented by a low temperature polycrystalline silicon (LTPS) transistor, but the example embodiments of the present disclosure are not limited thereto. As another example, the fourth switching transistor ST4 can be an n-type MOSFET (NMOS) and can be implemented by an oxide transistor. The fourth switching transistor ST4 can include a source electrode connected to an initialization voltage line which transmits an initialization voltage Vini, a drain electrode connected to the second node N2, and a gate electrode connected to a fourth scan signal line which transmits a fourth scan signal Scan4. Accordingly, the fourth switching transistor ST4 can apply the initialization voltage Vini to the second node N2 which is the gate electrode of the driving transistor DT, in response to a low level of the fourth scan signal Scan4 which is a turn-on voltage.

The fifth switching transistor ST5 can apply a high potential power voltage VDD to the first node N1 which is the source electrode of the driving transistor DT. For example, the fifth switching transistor ST5 can be a p-type MOSFET (PMOS) and can be implemented by a low temperature polycrystalline silicon (LTPS) transistor, but the example embodiments of the present disclosure are not limited thereto. As another example, the fifth switching transistor ST5 can be an n-type MOSFET (NMOS) and can be implemented by an oxide transistor. The fifth switching transistor ST5 can include a source electrode connected to a high potential driving voltage line which transmits a high potential power voltage VDD, a drain electrode connected to the first node N1, and a gate electrode connected to an emission signal line which transmits an emission signal EM. Accordingly, the fifth switching transistor ST5 can apply the high potential power voltage VDD to the first node N1 which is the source electrode of the driving transistor DT, in response to a low level of the emission signal EM which is a turn-on voltage.

The sixth switching transistor ST6 can form a current path between the driving transistor DT and the light emitting diode ED. For example, the sixth switching transistor ST6 can be a p-type MOSFET (PMOS) and can be implemented by a low temperature polycrystalline silicon (LTPS) transistor, but the example embodiments of the present disclosure are not limited thereto. As another example, the sixth switching transistor ST6 can be an n-type MOSFET (NMOS) and can be implemented by an oxide transistor. The sixth switching transistor ST6 can include a source electrode connected to the third node N3, a drain electrode connected to the fourth node N4, and a gate electrode connected to the emission signal line which transmits an emission signal EM. The sixth switching transistor ST6 can form a current path between the third node N3 which is a source electrode of the sixth switching transistor ST6 and the fourth node N4 which is a drain electrode of the sixth switching transistor ST6, in response to the emission signal EM. Accordingly, the sixth switching transistor ST6 can form a current path between the driving transistor DT and the light emitting diode ED in response to a low level of the emission signal EM which is a turn-on voltage.

The seventh switching transistor ST7 can apply a reset voltage VAR to the fourth node N4 which is an anode of the light emitting diode ED. For example, the seventh switching transistor ST7 can be a p-type MOSFET (PMOS) and can be implemented by a low temperature polycrystalline silicon (LTPS) transistor, but the example embodiments of the present disclosure are not limited thereto. As another example, the seventh switching transistor ST7 can be an n-type MOSFET (NMOS) and can be implemented by an oxide transistor. The seventh switching transistor ST7 can include a source electrode connected to a reset voltage line which transmits a reset voltage VAR, a drain electrode connected to the fourth node N4, and a gate electrode connected to a third scan signal line which transmits a third scan signal Scan3. Accordingly, the seventh switching transistor ST7 can apply the reset voltage VAR to the fourth node N4 which is the anode of the light emitting diode ED, in response to a low level of the third scan signal Scan3 which is a turn-on level. The reset voltage VAR can be an anode reset voltage, but the example embodiments of the present disclosure are not limited thereto.

The eighth switching transistor ST8 can apply an on-bias stress voltage Vobs to the first node N1 which is the source electrode of the driving transistor DT. For example, the eighth switching transistor ST8 can be a p-type MOSFET (PMOS) and can be implemented by a low temperature polycrystalline silicon (LTPS) transistor, but the example embodiments of the present disclosure are not limited thereto. As another example, the eighth switching transistor ST8 can be an n-type MOSFET (NMOS) and can be implemented by an oxide transistor. The eighth switching transistor ST8 can include a source electrode connected to an on-bias stress voltage line which transmits an on-bias stress voltage Vobs, a drain electrode connected to the first node N1, and a gate electrode connected to a third scan signal line which transmits a third scan signal Scan3. Accordingly, the eighth switching transistor ST8 can apply the on-bias stress voltage Vobs to the first node N1 which is the source electrode of the driving transistor DT, in response to a low level of the third scan signal Scan3 which is a turn-on level.

The storage capacitor Cst can store a voltage applied to the second node N2. The storage capacitor Cst can include a first electrode connected to the second node N2 and a second electrode connected to the high potential power voltage line which transmits a high potential power voltage VDD. For example, one electrode of the storage capacitor Cst is connected to the gate electrode of the driving transistor DT and the other electrode of the storage capacitor Cst is connected to the high potential power line which transmits the high potential power voltage VDD.

Figure 3:
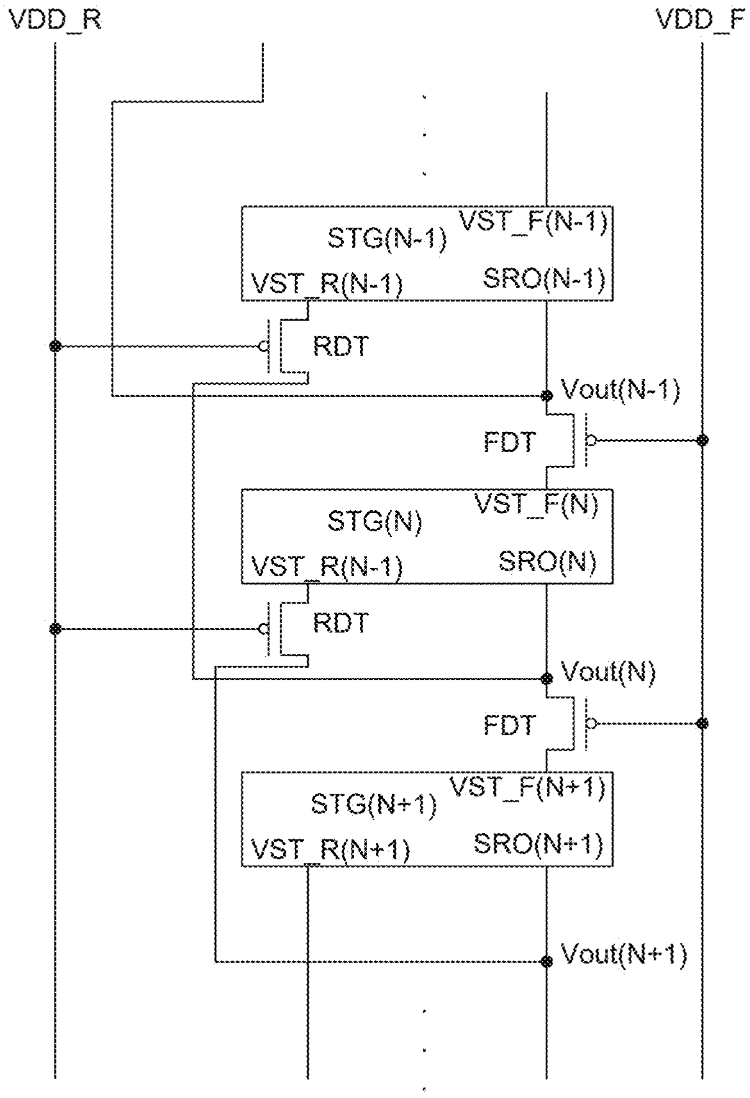
FIG. 3 is a block diagram of a gate driver of a display apparatus according to an example embodiment of the present disclosure.

FIG. 3 is a block diagram of a gate driver of a display apparatus according to an example embodiment of the present disclosure. In FIG. 3, for the convenience of description, only a part of a plurality of stages STG which configures a gate driver, for example, first stage STG(N−1) to third stage STG(N+1) and scan direction controllers FDT and RDT are illustrated.

Referring to FIG. 3, each gate driver GD includes a plurality of stages STG and scan direction controllers FDT and RDT.

The plurality of stages STG is independently connected to sequentially generate an output. The plurality of stages STG can output an output signal Vout whose phase is shifted by a predetermined time. For example, the output signal can be a scan signal or an emission signal. The output signal is applied to gate lines GL connected to the pixel P and serves as a carry signal which is transmitted to a next stage. Here, the next stage can vary depending on a scan direction. For example, in a forward scan mode, a next stage can refer to a stage which is adjacent to a current stage to be disposed therebelow, meaning a stage that is positioned directly following the current stage. Further, in a backward scan mode, a next stage can refer to a stage which is adjacent to a current stage to be disposed thereabove, meaning a stage that is positioned directly preceding the current stage.

The plurality of stages STG receives a start signal VST of the start signal line or an output signal of a previous stage STG to output the signal to a gate line GL corresponding to each of the plurality of stages STG. The plurality of stages STG is supplied with clock signals CLK having different phases to output an output signal. For example, a first stage STG(N−1), among the plurality of stages STG, inputs a start signal VST of a start signal line to a forward input terminal VST_F(N−1) in a forward scan mode and can input an output signal of a previous stage STG(N) to a backward input terminal VST_R(N−1) in a backward scan mode.

For example, the plurality of stages STG can output output signals Vout(N−1), Vout(N), and Vout(N+1) in the order of first stage STG(N−1) to third stage STG(N+1) in the forward scan mode. In the forward scan mode, the first stage STG(N−1) disposed on the top of the plurality of stages STG can operate by inputting the start signal VST from the outside (timing controller TC) to the forward input terminal VST_F(N−1). Further, the second stage STG(N) and the third stage STG(N+1) can operate by inputting output signals Vout(N−1) and Vout(N) output from the first stage STG(N−1) and the second stage STG(N) which are previous stages to forward input terminals VST_F(N) and VST_F(N+1) as start signals.

For example, the plurality of stages STG can output output signals Vout(N+1), Vout(N), and Vout(N−1) in the order of third stage STG(N+1) to first stage STG(N−1) in the backward scan mode. In the backward scan mode, the third stage STG(N+1) disposed on the bottom of the plurality of stages STG operates by inputting the start signal VST from the outside (timing controller TC) to the backward input terminal VST_R(N+1). The position of the stages may be different, however for the backward scan mode the "next stage" is a stage that is located (positioned) directly preceding the current stage. In the forward scan mode the "next stage" is a stage that is located (positioned) directly following the current stage. Further, the second stage STG(N) and the first stage STG(N−1) can operate by inputting output signals Vout(N+1) and Vout(N) output from the third stage STG(N+1) and the second stage STG(N) which are previous stages to backward input terminals VST_R(N) and VST_R (N−1) as start signals.

Each of the plurality of scan direction controllers FDT and RDT can be disposed between the plurality of stages STG. The plurality of scan direction controllers FDT and RDT connects input terminals and output terminals of the plurality of stages STG according to the first control signal VDD_F and the second control signal VDD_R. The first control signal VDD_F and the second control signal VDD_R can be constant voltages. For example, the first control signal VDD_F and the second control signal VDD_R can be high level or low level of constant voltages. The first control signal VDD_F and the second control signal VDD_R are opposite levels of voltages. For example, if the first control signal VDD_F is a high level of voltage, the second control signal VDD_R can be a low level of voltage and if the second control signal VDD_R is a high level of voltage, the first control signal VDD_F can be a low level of voltage.

The plurality of scan direction controllers FDT and RDT can include a plurality of first control transistors FDT and a plurality of second control transistors RDT.

The plurality of first control transistors FDT can be connected between a corresponding stage and a next stage. For example, the first control transistor FDT can be connected between the first stage STG(N−1) and the second stage STG(N) and between the second stage STG(N) and the third stage STG(N+1).

For example, a source electrode of the first control transistor FDT connected between the first stage STG(N−1) and the second stage STG(N) is connected to an output terminal SRO(N−1) of the first stage STG(N−1) and a drain electrode is connected to a forward input terminal VST_F(N) of the second stage STG(N). A gate electrode can be connected to a first control signal line to which a first control signal VDD_F is applied. Further, a source electrode of the first control transistor FDT connected between the second stage STG(N) and the third stage STG(N+1) is connected to an output terminal SRO(N) of the second stage STG(N) and a drain electrode is connected to a forward input terminal VST_F(N+1) of the third stage STG(N+1). A gate electrode can be connected to a first control signal line to which the first control signal VDD_F is applied. For example, the plurality of first control transistors FDT can be p-type MOSFETs (PMOS) or can be implemented by a low temperature polycrystalline silicon (LTPS) thin film transistor. Therefore, when the first control signal VDD_F is a low level, the plurality of first control transistors FDT can be turned on. Accordingly, the remaining stages STG(N) and STG(N+1) excluding the first stage STG(N−1) can operate by connecting forward input terminals VST_F(N) and VST_F(N+1) to output terminals SRO(N−1) and SRO(N) of previous stages STG(N−1) and STG(N) to input the output signals Vout(N−1) and Vout(N) as start signals.

The plurality of second control transistors RDT can be connected between a corresponding stage and a next stage. For example, the second control transistor RDT can be connected between the third stage STG(N+1) and the second stage STG(N) and between the second stage STG(N) and the first stage STG(N−1).

For example, a source electrode of the second control transistor RDT connected between the third stage STG(N+1) and the second stage STG(N) is connected to an output terminal SRO(N+1) of the third stage STG(N+1) and a drain electrode is connected to a backward input terminal VST_R (N) of the second stage STG(N). A gate electrode can be connected to a second control signal line to which a second control signal VDD_R is applied. Further, a source electrode of the second control transistor RDT connected between the second stage STG(N) and the first stage STG(N−1) is connected to an output terminal SRO(N) of the second stage STG(N) and a drain electrode is connected to a backward input terminal VST_R(N−1) of the first stage STG(N−1). A gate electrode can be connected to a second control signal line to which a second control signal VDD_R is applied. For example, the plurality of second control transistors RDT can be p-type MOSFETs (PMOS) or can be implemented by a low temperature polycrystalline silicon (LTPS) thin film transistor. Therefore, when the second control signal VDD_R is a low level, the plurality of second control transistors RDT can be turned on. Accordingly, the remaining stages STG(N) and STG(N−1) excluding the last stage STG(N+1) can operate by connecting backward input terminals VST_R(N) and VST_R(N−1) to output terminals SRO(N) and SRO(N+1) of previous stages STG(N) and STG(N+1) to input the output signals Vout(N) and Vout(N+1) as start signals.

Figure 4:
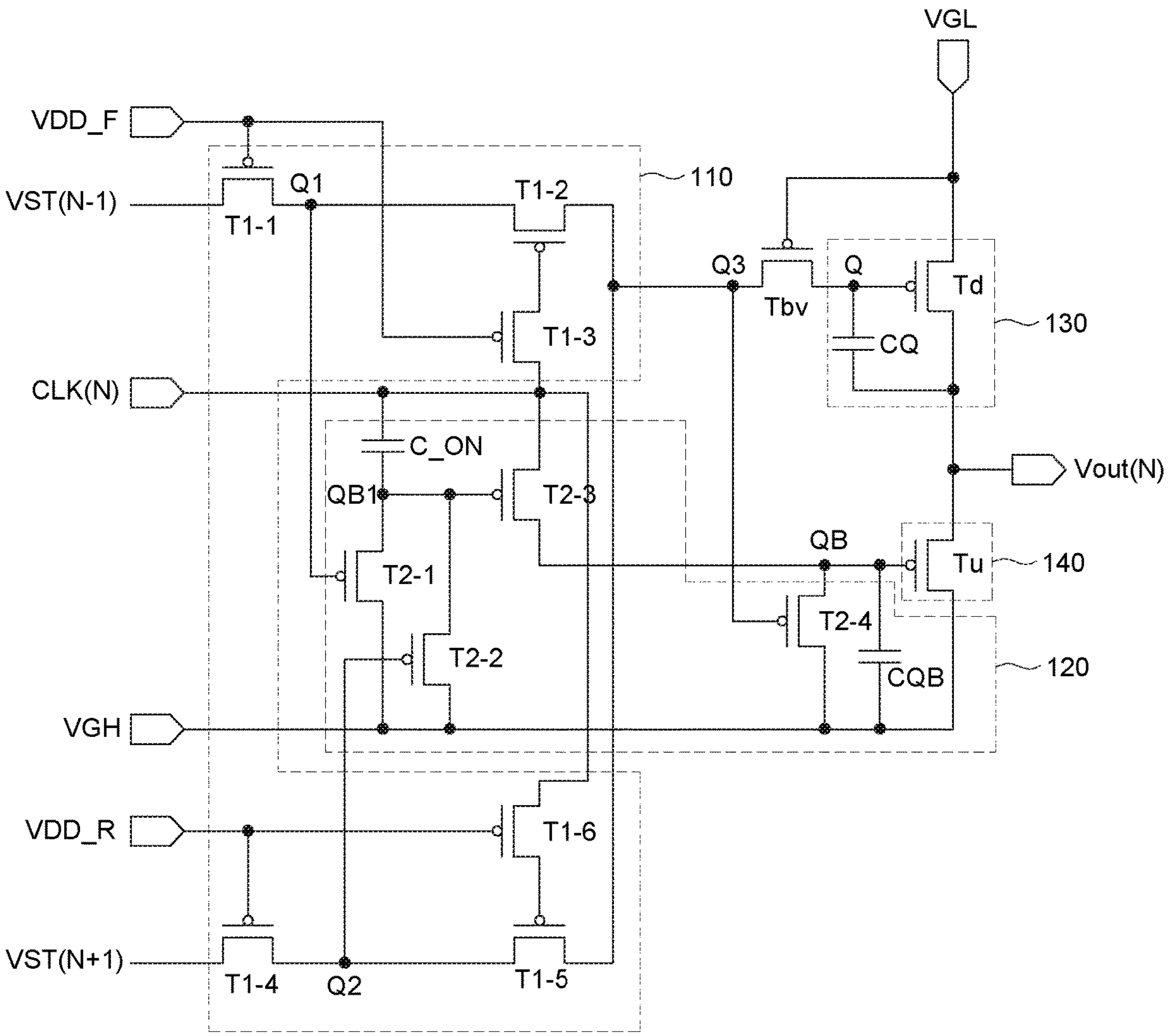
FIG. 4 is an example circuit diagram of a gate driver of a display apparatus according to an example embodiment of the present disclosure.

FIG. 4 is an example circuit diagram of a gate driver of a display apparatus according to an example embodiment of the present disclosure. In FIG. 4, for the convenience of description, only an N-th stage STG(N) is illustrated, but the remaining stages of the plurality of stages STG as described herein can be also configured by the same circuit. FIG. 4 will be described together with FIG. 3.

Referring to FIG. 4, a stage STG(N) can include a Q node controller 110, a QB node controller 120, a pull-down unit 130, and a pull-up unit 140.

The Q node controller 110 can control a voltage of the Q node Q according to a scan mode.

The Q node controller 110 can control a voltage of the Q node Q according to a forward scan mode or a backward scan mode.

The Q node controller 110 can control a voltage of the Q node Q according to a first control signal VDD_F, output signals Vout(N−1) and Vout(N+1) of a previous stage, a clock signal CLK(N), and a second control signal VDD_R.

The Q node controller 110 can include a 1-1-th transistor T1-1, a 1-2-th transistor T1-2, a 1-3-th transistor T1-3, a 1-4-th transistor T1-4, a 1-5-th transistor T1-5, and a 1-6-th transistor T1-6.

The 1-1-th transistor T1-1 can be connected between an input terminal VST_F(N) to which an output signal Vout (N−1) of the previous stage is input and the Q1 node Q1.

For example, a source electrode of the 1-1-th transistor T1-1 is connected to an input terminal VST_F(N) to which an output signal Vout(N−1) of the previous stage is input and a drain electrode can be connected to the Q1 node Q1. Further, a gate electrode of the 1-1-th transistor T1-1 can be connected to a first control signal line to which a first control signal VDD_F is supplied. For example, the 1-1-th transistor T1-1 can be a p-type MOSFET (PMOS) and can be implemented by a low temperature polycrystalline silicon (LTPS) transistor, but the example embodiments of the present disclosure are not limited thereto. Therefore, when the first control signal VDD_F is a low level of voltage which is a turn-on voltage, the 1-1-th transistor T1-1 can apply an output signal Vout(N−1) of the previous stage to the Q1 node Q1.

The 1-2-th transistor T1-2 can be connected between the Q1 node Q1 and the Q3 node Q3.

For example, a source electrode of the 1-2-th transistor T1-2 is connected to the Q1 node Q1 and a drain electrode can be connected to the Q3 node Q3. Further, a gate electrode of the 1-2-th transistor T1-2 can be connected to a drain electrode of the 1-3-th transistor T1-3. For example, the 1-2-th transistor T1-2 can be a p-type MOSFET (PMOS) and can be implemented by a low temperature polycrystalline silicon (LTPS) transistor, but the example embodiments of the present disclosure are not limited thereto. Therefore, when a clock signal CLK(N) which is applied to the gate electrode is a low level of voltage which is a turn-on voltage, the 1-2-th transistor T1-2 can apply a voltage of the Q1 node Q1 to the Q3 node Q3.

The 1-3-th transistor T1-3 can be connected between a clock signal line to which a clock signal CLK(N) is applied and the 1-2-th transistor T1-2.

For example, a source electrode of the 1-3-th transistor T1-3 is connected to a clock signal line to which a clock signal CLK(N) is applied and a drain electrode can be connected to a gate electrode of the 1-2-th transistor T1-2. Further, a gate electrode of the 1-3-th transistor T1-3 can be connected to a first control signal line to which a first control signal VDD_F is supplied. For example, the 1-3-th transistor T1-3 can be a p-type MOSFET (PMOS) and can be implemented by a low temperature polycrystalline silicon (LTPS) transistor, but the example embodiments of the present disclosure are not limited thereto. Therefore, when the first control signal VDD_F is a low level of voltage which is a turn-on voltage, the 1-3-th transistor T1-3 can apply a clock signal CLK(N) to the gate electrode of the 1-2-th transistor T1-2.

The 1-4-th transistor T1-4 can be connected between an input terminal VST_R(N) to which an output signal Vout (N+1) of the previous stage is input and the Q2 node Q2.

For example, a source electrode of the 1-4-th transistor T1-4 is connected to an input terminal VST_R(N) to which an output signal Vout(N+1) of the previous stage is input and a drain electrode can be connected to the Q2 node Q2. Further, a gate electrode of the 1-4-th transistor T1-4 can be connected to a second control signal line to which a second control signal VDD_R is supplied. For example, the 1-4-th transistor T1-4 can be a p-type MOSFET (PMOS) and can be implemented by a low temperature polycrystalline silicon (LTPS) transistor, but the example embodiments of the present disclosure are not limited thereto. Therefore, when the second control signal VDD_R is a low level of voltage which is a turn-on voltage, the 1-4-th transistor T1-4 can apply an output signal Vout(N+1) of the previous stage to the Q2 node Q2.

The 1-5-th transistor T1-5 can be connected between the Q2 node Q2 and the Q3 node Q3.

For example, a source electrode of the 1-5-th transistor T1-5 is connected to the Q2 node Q2 and a drain electrode can be connected to the Q3 node Q3. Further, a gate electrode of the 1-5-th transistor T1-5 can be connected to a drain electrode of the 1-6-th transistor T1-6. For example, the 1-5-th transistor T1-5 can be a p-type MOSFET (PMOS) and can be implemented by a low temperature polycrystalline silicon (LTPS) transistor, but the example embodiments of the present disclosure are not limited thereto. Therefore, when a clock signal CLK(N) which is applied to the gate electrode is a low level of voltage which is a turn-on voltage, the 1-5-th transistor T1-5 can apply a voltage of the Q2 node Q2 to the Q3 node Q3.

The 1-6-th transistor T1-6 can be connected between a clock signal line to which a clock signal CLK(N) is applied and the 1-5-th transistor T1-5.

For example, a source electrode of the 1-6-th transistor T1-6 is connected to a clock signal line to which a clock signal CLK(N) is applied and a drain electrode can be connected to the gate electrode of the 1-5-th transistor T1-5. Further, a gate electrode of the 1-6-th transistor T1-6 can be connected to a second control signal line to which a second control signal VDD_R is supplied. For example, the 1-6-th transistor T1-6 can be a p-type MOSFET (PMOS) and can be implemented by a low temperature polycrystalline silicon (LTPS) transistor, but the example embodiments of the present disclosure are not limited thereto. Therefore, when the second control signal VDD_R is a low level of voltage which is a turn-on voltage, the 1-6-th transistor T1-6 can apply a clock signal CLK(N) to the gate electrode of the 1-5-th transistor T1-5.

The QB node controller 120 can control a voltage of the QB node QB according to a scan mode.

The QB node controller 120 can control a voltage of the QB node QB according to a forward scan mode or a backward scan mode.

The QB node controller 120 can control a voltage of the QB node QB according to output signals Vout(N−1) and VST(N+1) of the previous stage and the clock signal CLK (N).

The QB node controller 120 can include a 2-1-th transistor T2-1, a 2-2-th transistor T2-2, a 2-3-th transistor T2-3, a 2-4-th transistor T2-4, and a first capacitor C_ON.

The 2-1-th transistor T2-1 can be connected between the gate high voltage line to which the gate high voltage VGH is applied and the QB1 node QB1.

For example, a source electrode of the 2-1-th transistor T2-1 is connected to the gate high voltage line to which the gate high voltage VGH is supplied and a drain electrode can be connected to the QB1 node QB1. Further, a gate electrode of the 2-1-th transistor T2-1 can be connected to the Q1 node Q1. For example, the 2-1-th transistor T2-1 can be a p-type MOSFET (PMOS) and can be implemented by a low temperature polycrystalline silicon (LTPS) transistor, but the example embodiments of the present disclosure are not limited thereto. Therefore, the 2-1-th transistor T2-1 can apply the gate high voltage VGH to the QB1 node QB1 in response to a low level of output signal Vout(N−1) of a previous stage which is a turn-on voltage.

The 2-2-th transistor T2-2 can be connected between the gate high voltage line to which the gate high voltage VGH is applied and a QB1 node QB1.

For example, a source electrode of the 2-2-th transistor T2-2 is connected to the gate high voltage line to which the gate high voltage VGH is supplied and a drain electrode can be connected to the QB1 node QB1. Further, a gate electrode of the 2-2-th transistor T2-2 can be connected to the Q2 node Q2. For example, the 2-2-th transistor T2-2 can be a p-type MOSFET (PMOS) and can be implemented by a low temperature polycrystalline silicon (LTPS) transistor, but the example embodiments of the present disclosure are not limited thereto. Therefore, the 2-2-th transistor T2-2 can apply the gate high voltage VGH to the QB1 node QB1 in response to a low level of output signal Vout(N+1) of a previous stage which is a turn-on voltage.

The first capacitor C_ON can be connected between a clock signal line to which the clock signal CLK(N) is applied and the QB1 node QB1.

For example, a first electrode of the first capacitor C_ON is connected to the clock signal line to which the clock signal CLK(N) is applied and a second electrode can be connected to the QB1 node QB1. Therefore, the first capacitor C_ON can store a voltage which is applied to the QB1 node QB1.

The 2-3-th transistor T2-3 can be connected between a clock signal line to which the clock signal CLK (n) is applied and the QB node QB.

For example, a source electrode of the 2-3-th transistor T2-3 is connected to the clock signal line to which the clock signal CLK(N) is applied and a drain electrode can be connected to the QB node QB. Further, a gate electrode of the 2-3-th transistor T2-3 can be connected to the QB1 node QB1. For example, the 2-3-th transistor T2-3 can be a p-type MOSFET (PMOS) and can be implemented by a low temperature polycrystalline silicon (LTPS) transistor, but the example embodiments of the present disclosure are not limited thereto. Therefore, the 2-3-th transistor T2-3 can apply a low level of the clock signal CLK(N) to the QB node QB in response to a low level of the clock signal CLK(N) which is a turn-on voltage.

The 2-4-th transistor T2-4 can be connected between the gate high voltage line to which the gate high voltage VGH is applied and a QB node QB.

For example, a source electrode of the 2-4-th transistor T2-4 is connected to the gate high voltage line to which the gate high voltage VGH is applied and a drain electrode can be connected to the QB node QB. Further, a gate electrode of the 2-4-th transistor T2-4 can be connected to the Q3 node Q3. For example, the 2-4-th transistor T2-4 can be a p-type MOSFET (PMOS) and can be implemented by a low temperature polycrystalline silicon (LTPS) transistor, but the example embodiments of the present disclosure are not limited thereto. Therefore, when a voltage applied to the Q3 node Q3 is a low level voltage which is a turn-on voltage, the 2-4-th transistor T2-4 can apply the gate high voltage VGH to the QB node QB.

The QB node controller 120 can further include a second capacitor CQB.

The second capacitor CQB can be connected between the gate high voltage line to which the gate high voltage VGH is applied and the QB node QB.

For example, a first electrode of the second capacitor CQB is connected to the gate high voltage line to which the gate high voltage VGH is supplied and a second electrode can be connected to the QB node QB. Therefore, the second capacitor CQB can maintain a voltage which is applied to the QB node QB for a predetermined period.

A third transistor Tbv can be connected between the Q3 node Q3 and the Q node Q.

For example, a source electrode of the third transistor Tbv is connected to the Q3 node Q3 and a drain electrode can be connected to the Q node Q. Further, a gate electrode of the third transistor Tbv can be connected to the gate low voltage line to which the gate low voltage VGL is supplied. For example, the third transistor Tbv can be a p-type MOSFET (PMOS) and can be implemented by a low temperature polycrystalline silicon (LTPS) transistor, but the example embodiments of the present disclosure are not limited thereto. Therefore, the third transistor Tbv maintains a turn-on state by the gate low voltage VGL which is supplied to the gate low voltage line to apply a voltage which is applied to the Q3 node Q3 to the Q node Q.

Therefore, when the Q node Q is bootstrapped, a channel current of the third transistor Tbv can become zero. For example, the third transistor Tbv is turned off while the Q node Q is bootstrapped to block the electric connection of the Q3 node Q3 and the Q node Q. Further, the third transistor is turned on while the Q node Q is not bootstrapped to electrically connect the Q3 node Q3 and the Q node Q.

The third transistor Tbv suppresses the voltage of the Q3 node Q3 so as not to sharply change while the Q node Q is bootstrapped so that the electric stress applied to the 1-2-th transistor T1-2 and the 1-5-th transistor T1-5 connected to the Q3 node Q3 can be reduced.

The pull-down unit 130 can output a gate low voltage VGL as an output signal Vout(n) according to a voltage of the Q node Q.

The pull-down unit 130 can include a pull-down transistor Td and a third capacitor CQ.

The pull-down transistor Td can be connected between a gate low voltage line to which the gate low voltage VGL is supplied and an output terminal from which an output signal Vout(n) is output.

For example, a source electrode of the pull-down transistor Td is connected to a gate low voltage line to which the gate low voltage VGL is supplied and a drain electrode can be connected to the output terminal from which an output signal Vout(n) is output. Further, a gate electrode of the pull-down transistor Td can be connected to the Q node Q. For example, the pull-down transistor Td can be a p-type MOSFET (PMOS) and can be implemented by a low temperature polycrystalline silicon (LTPS) transistor, but the example embodiments of the present disclosure are not limited thereto. Therefore, when a voltage of the Q node Q is a low level voltage which is a turn-on voltage, the pull-down transistor Td can apply the gate low voltage VGL as an output signal Vout(n).

The third capacitor CQ can be connected between the Q node Q and the output terminal.

For example, a first electrode of the third capacitor CQ is connected to the Q node Q and a second electrode can be connected to the output terminal. Therefore, when the output signal Vout(n) which is output is changed from the gate high voltage VGH to the gate low voltage VGL, the third capacitor CQ can bootstrap the Q node Q by reflecting the voltage change of the output terminal to the Q node Q.

The pull-up unit 140 can output a gate high voltage as an output signal Vout(n) according to a voltage of the QB node QB.

The pull-up unit 140 can include a pull-up transistor Tu.

The pull-up transistor Tu can be connected between a gate high voltage line to which the gate high voltage VGH is supplied and an output terminal from which an output signal Vout(n) is output.

For example, a source electrode of the pull-up transistor Tu is connected to the gate high voltage line to which the gate high voltage VGH is supplied and a drain electrode can be connected to the output terminal. Further, a gate electrode of the pull-up transistor Tu can be connected to the QB node QB. For example, the pull-up transistor Tu can be a p-type MOSFET (PMOS) and can be implemented by a low temperature polycrystalline silicon (LTPS) transistor, but the example embodiments of the present disclosure are not limited thereto. Therefore, when a voltage of the QB node QB is a low level voltage which is a turn-on voltage, the pull-up transistor Tu can output the gate high voltage VGH as an output signal Vout(n).

Accordingly, in the display apparatus 100 according to the example embodiment of the present disclosure, a driving direction of the gate driver GD can be selected.

In the gate driver of the display apparatus, a plurality of stages is independently connected to sequentially output. However, the plurality of stages has a problem in that the output is performed only in one direction from a stage disposed on the top to a stage disposed on the bottom.

Therefore, in the display apparatus 100 according to the example embodiment of the present disclosure, the scan direction controllers FDT and RDT are disposed between the plurality of stages STG to select a driving direction of the gate driver GD according to a first control signal VDD_F and a second control signal VDD_R. Further, each stage STG includes a Q node controller 110 which controls a voltage of the Q node according to the scan mode and a QB node controller 140 which controls a voltage of the QB node according to the scan mode. Therefore, the stage outputs a scan signal in a forward direction and a backward direction according to the first control signal VDD_F and the second control signal VDD_R to be driven in both directions.

Figure 5:
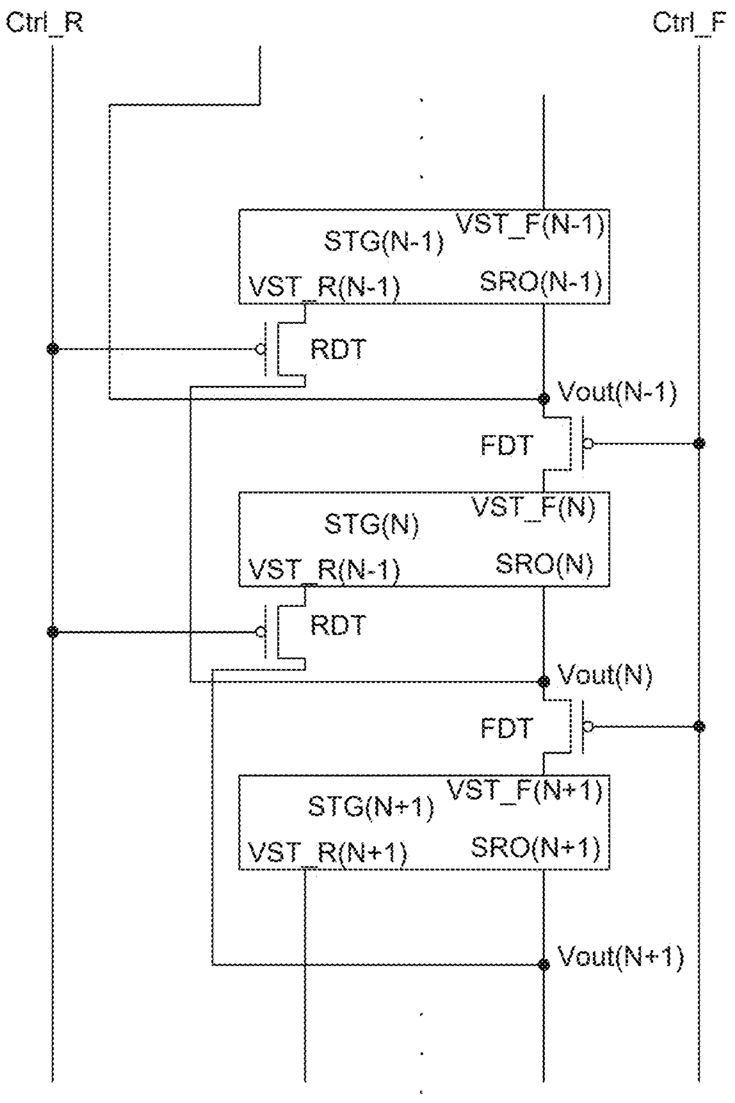
FIG. 5 is a block diagram of a gate driver of a display apparatus according to another example embodiment of the present disclosure.
Figure 6:
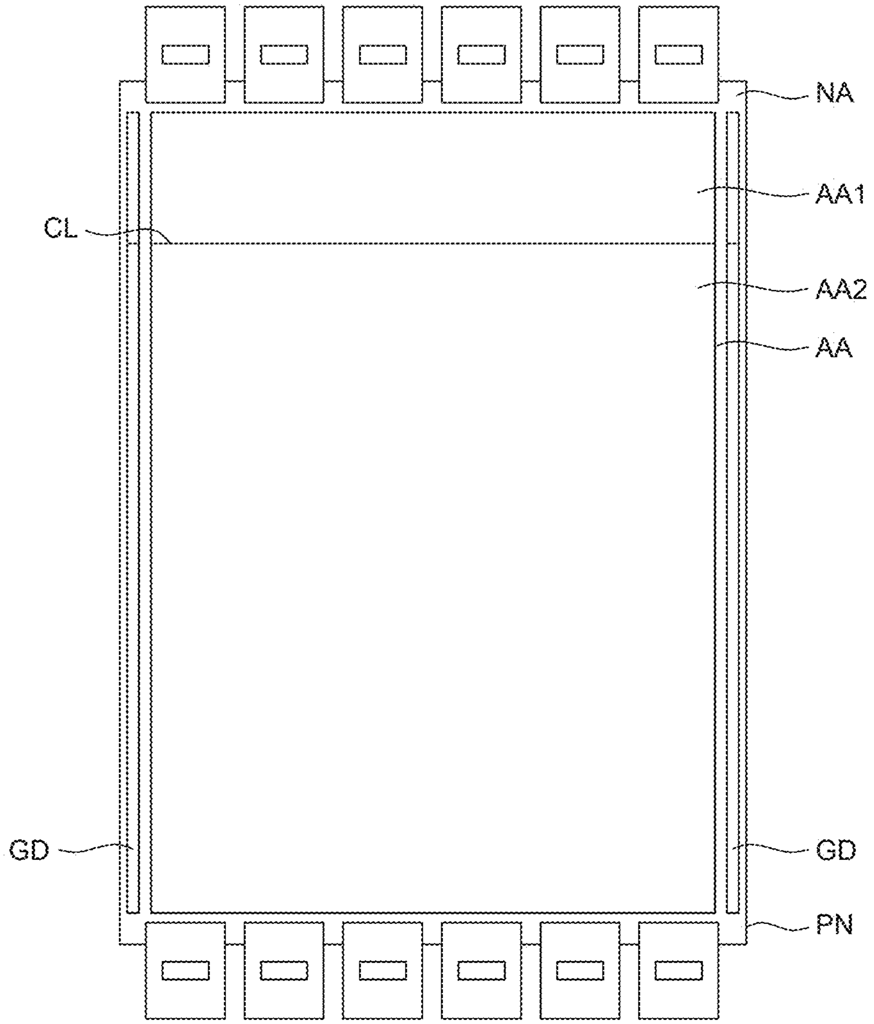
FIG. 6 is a plan view for explaining an operation of a display apparatus according to another example embodiment of the present disclosure.
Figure 7:
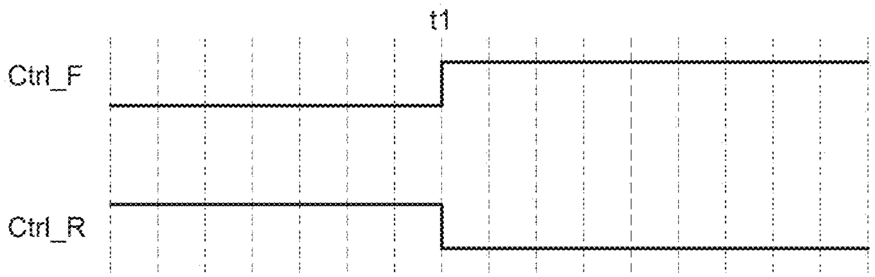
FIG. 7 is a waveform diagram of a control signal for explaining an operation of a display apparatus according to another example embodiment of the present disclosure.
Figure 8:
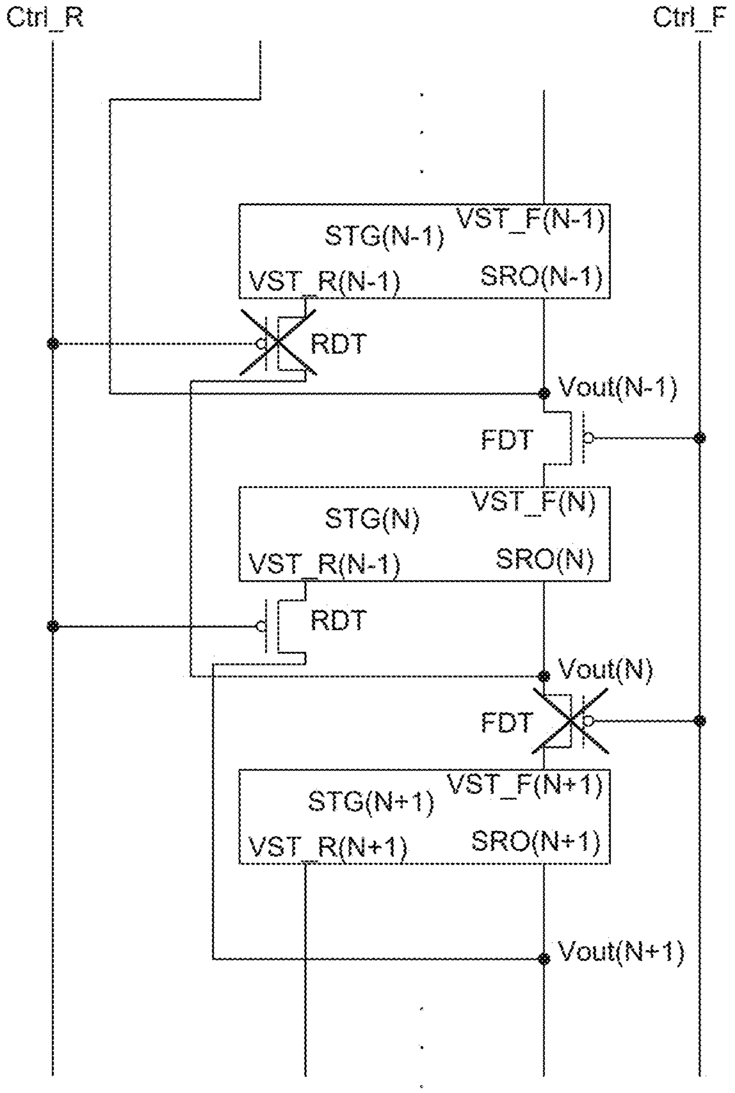
FIG. 8 is a block diagram of a gate driver for explaining an operation of a display apparatus according to another example embodiment of the present disclosure.

FIG. 5 is a block diagram of a gate driver of a display apparatus according to another example embodiment of the present disclosure. FIG. 6 is a plan view for explaining an operation of a display apparatus according to another example embodiment of the present disclosure. FIG. 7 is a waveform diagram of a control signal for explaining an operation of a display apparatus according to another example embodiment of the present disclosure. FIG. 8 is a block diagram of a gate driver for explaining an operation of a display apparatus according to another example embodiment of the present disclosure. In FIG. 5, the remaining configurations excluding a plurality of first control transistors FDT and a plurality of second control transistors RDT are the same as that in FIG. 3 so that a detailed description will be omitted or may be briefly provided.

Referring to FIG. 5, in a display apparatus 200 according to another example embodiment of the present disclosure, the plurality of first control transistors FDT and the plurality of second control transistors RDT can be connected between the plurality of stages STG.

The plurality of first control transistors FDT can connect forward input terminals VST_F(N−1), VST_F(N), and VST_F(N+1) and output terminals SRO(N−1), SRO(N), and SRO(N+1) of the plurality of stages STG in response to a first control signal Ctrl_F. For example, gate electrodes of the plurality of first control transistors FDT can be connected to the first control signal line to which the first control signal Ctrl_F is applied. Therefore, when the first control signal Ctrl_F is a low level, the plurality of first control transistors FDT can be turned on. Accordingly, the plurality of stages STG(N) and STG(N+1) can operate by connecting forward input terminals VST_F(N) and VST_F(N+1) to output terminals SRO(N−1) and SRO(N) of previous stages STG(N−1) and STG(N) to input the output signals Vout(N−1) and Vout(N) as start signals.

The plurality of second control transistors RDT can connect backward input terminals VST_R(N−1), VST_R(N), and VST_R(N+1) and output terminals SRO(N−1), SRO(N), and SRO(N+1) of the plurality of stages STG in response to the second control signal Ctrl_R. For example, gate electrodes of the plurality of second control transistors RDT can be connected to the second control signal line to which the second control signal Ctrl_R is applied. Therefore, when the second control signal Ctrl_R is a low level, the plurality of second control transistors RDT can be turned on. Accordingly, the plurality of stages STG(N) and STG(N−1) can operate by connecting backward input terminals VST_R(N) and VST_R(N−1) to output terminals SRO(N) and SRO(N+1) of previous stages STG(N) and STG(N+1) to input the output signals Vout(N) and Vout(N+1) as start signals.

Referring to FIGS. 6 to 8, the display panel PN can be driven to be divided in a first active area AA1 and a second active area AA2 according to the operation. The first active area AA1 and the second active area AA2 can be driven at different frequencies with respect to a carry open line CL between the first active area AA1 and the second active area AA2.

Referring to FIGS. 6 to 8, a first time t1 can correspond to a carry open line CL of FIG. 6. Voltage levels of the first control signal Ctrl_F and the second control signal Ctrl_R are changed at the first time t1.

For example, the first control signal Ctrl_R is changed from a low level voltage to a high level voltage at the first time t1 and the second control signal Ctrl_R is changed from a high level voltage to a low level voltage at the first time t1.

For example, when the second stage STG(N) corresponds to the carry open line CL, a low level of the first control signal Ctrl_F is input until the first time t1 and a high level of the first control signal Ctrl_F can be input after the first time t1. In this case, the first control transistor FDT connected between the stages from the first stage STG(N−1) to the second stage STG(N) is turned on by a low level of the first control signal Ctrl_F which is a turn-on voltage. The first control transistor FDT connected between the stages from the second stage STG(N) to the last stage STG(N+1) is turned off by a high level of the first control signal Ctrl_F which is a turn-off voltage.

Further, a high level of the second control signal Ctrl_R is input until the first time t1 and a low level of the second control signal Ctrl_R can be input after the first time t1. In this case, a second control transistor RDT connected between the stages from the first stage STG(N−1) to the second stage STG(N) is turned off by a high level of the second control signal Ctrl_R which is a turn-off voltage. The second control transistor RDT connected between the stages from the second stage STG(N) to the last stage STG(N+1) can be turned on by a low level of the second control signal Ctrl_R which is a turn-on voltage.

For example, the first control signal Ctrl_F can be a signal which is driven at a frequency of 60 Hz. In this case, the first control signal Ctrl_F is supplied from the first stage STG(N−1) to be supplied to a stage located therebelow which is a subsequent stage. Therefore, the first active area AA1 can be driven at a frequency of 60 Hz. Further, the second control signal Ctrl_R can be a signal which is driven at a frequency of 120 Hz. In this case, the second control signal Ctrl_R is supplied from the last stage STG(N+1) to be supplied to a stage located thereabove which is a subsequent stage. Therefore, the second active area AA2 can be driven at the frequency of 120 Hz. Accordingly, the display apparatus 200 according to another example embodiment of the present disclosure divides the active area AA of the display panel PN to be driven at different frequencies for every active area AA.

When the display apparatus divides the display panel into a plurality of areas to be driven at different frequencies, there is a problem in that a control signal line connected to each area corresponding to a predetermined area is physically cut to connect a separate line. Further, there is a problem in that all the active areas should be driven at the same frequency to increase the power consumption.

Therefore, in the display apparatus 200 according to another example embodiment of the present disclosure, a plurality of first control transistors FDT and a plurality of second control transistors RDT are connected between the plurality of stages STG. The operations of the first control transistor FDT and the second control transistor RDT can be controlled by the first control signal Ctrl_F and the second control signal Ctrl_R. Some of the plurality of stages STG is controlled to output an output signal in a forward direction and the others of the plurality of stages can be controlled to output an output signal in a backward direction, according to the first control signal Ctrl_F and the second control signal Ctrl_R. Accordingly, the first control signal Ctrl_F and the second control signal Ctrl_R are controlled to control areas of the first active area AA1 and the second active area AA2 in the active area AA. Further, the first active area AA1 and the second active area AA2 have different driving frequencies so that when there is an image which can be driven at a low frequency, such as a still image, a stage STG corresponding to a part of the active area is driven at a low frequency so that the power consumption can be reduced.

Figure 9:
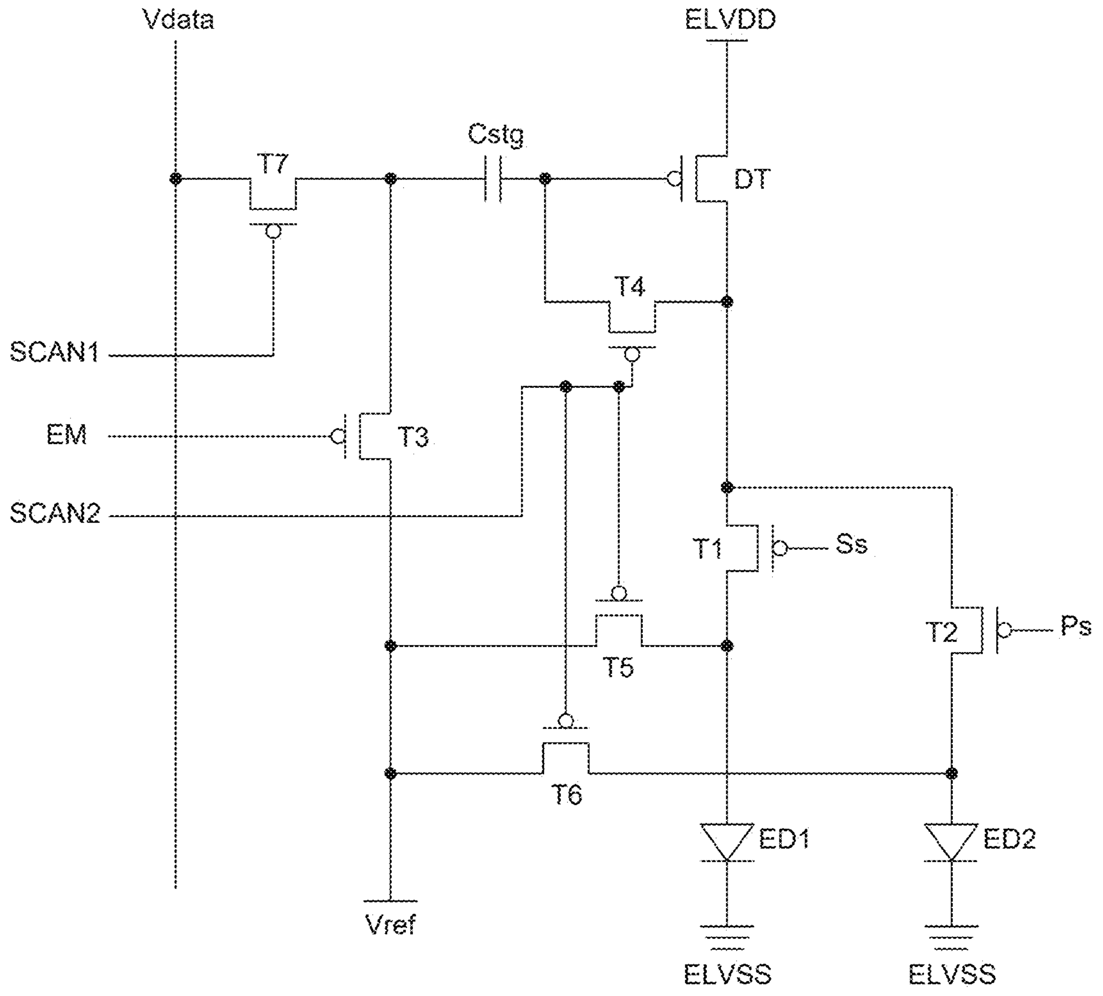
FIG. 9 is a circuit diagram illustrating a pixel circuit of a display apparatus according to still another example embodiment of the present disclosure.

FIG. 9 is a circuit diagram illustrating a pixel circuit of a display apparatus according to still another example embodiment of the present disclosure. The pixel P can include a plurality of sub pixels which represents different colors and pixel circuits corresponding to the plurality of sub pixels. FIG. 9 illustrates an example of a pixel circuit for one sub pixel disposed in the pixel P.

Referring to FIG. 9, the pixel circuit can include eight transistors and one capacitor.

The pixel circuit can include a driving transistor DT, a first transistor T1, a second transistor T2, a third transistor T3, a fourth transistor T4, a fifth transistor T5, a sixth transistor T6, a seventh transistor T7, and a capacitor Cstg.

Eight transistors included in the pixel circuit can be n-type transistors or p-type transistors. In the case of the p-type transistor, a low level voltage of each driving signal refers to a voltage which turns on the TFT and a high level voltage of each driving signal can refer to a voltage which turns off the TFT.

Here, the low level voltage can correspond to a predetermined voltage which is lower than the high level. For example, the low level voltage can include a voltage corresponding to a range of −8 V to −12 V. The high level voltage is a predetermined voltage which is higher than the low level voltage. For example, the high level voltage can include a voltage corresponding to the range of 12 V to 16 V. According to the example embodiment, the low level voltage is referred to as a first voltage and the high level voltage can be referred to as a second voltage. In this case, the first voltage can be lower than the second voltage. However, the range of the low level voltage and the high level voltage is illustrative, but is not limited thereto.

Here, a first electrode or a second electrode of the transistor to be described below can refer to a source electrode or a drain electrode. However, the terms of the first electrode and the second electrode are terms for distinguishing the electrodes, but do not limit what corresponds to each electrode. Further, in each electrode, the first electrode may not refer to the same electrode. For example, a first electrode of the first transistor T1 refers to a source electrode of the first transistor T1 and a first electrode of the sixth transistor T6 can refer to a drain electrode of the sixth transistor T6.

The driving transistor DT can be connected to the first transistor T1 connected to the first light emitting diode ED1 and the second transistor T2 connected to the second light emitting diode ED2. For example, a second electrode of the driving transistor DT can be connected to the first transistor T1 and the second transistor T2.

The driving transistor DT can be connected to a high potential power line which supplies a high potential power voltage ELVDD. For example, a first electrode of the driving transistor DT can be connected to the high potential voltage line. When the driving transistor DT is turned on, the high potential power voltage ELVDD supplied through the high potential power line can be transmitted from the first electrode to the second electrode of the driving transistor DT.

The first transistor T1 can be connected to at least one of the first light emitting diode ED1, the second transistor T2, the fourth transistor T4, and the fifth transistor T5.

For example, a first electrode of the first transistor T1 can be connected to the second transistor T2 and the fourth transistor T4. A second electrode of the first transistor T1 can be connected to the first light emitting diode ED1 and the fifth transistor T5. A gate electrode of the first transistor T1 can be connected to a first control signal line to which a wide field-of-view control signal Ss is applied. The first transistor T1 can be turned on or turned off by the wide field-of-view control signal Ss supplied through the first control signal line. Therefore, when the first transistor T1 is turned on, the voltage through the driving transistor DT can be applied to the first light emitting diode ED1 (for example, an anode electrode of the first light emitting diode ED1).

Here, the wide field-of-view control signal Ss is supplied by a mode controller (or a mode control circuit) and can control the driving (or emission) of the first light emitting diode ED1 in which a first lens is disposed.

The second transistor T2 can be connected to at least one of the second light emitting diode ED2, the first transistor T1, the fourth transistor T4, and the sixth transistor T6.

For example, a first electrode of the second transistor T2 can be connected to the first transistor T1 and the fourth transistor T4. A second electrode of the second transistor T2 can be connected to the sixth transistor T6 and the second light emitting diode ED2. A gate electrode of the second transistor T2 can be connected to a second control signal line to which a narrow field-of-view control signal Ps is applied. The second transistor T2 can be turned on or turned off by the narrow field-of-view control signal Ps supplied through the second control signal line. Therefore, when the second transistor T2 is turned on, the voltage through the driving transistor DT can be applied to the second light emitting diode ED2 (for example, an anode electrode of the second light emitting diode ED2).

Here, the narrow field-of-view control signal Ps is supplied by the mode controller (or the mode control circuit) and can control the driving (or emission) of the second light emitting diode ED2 in which a second lens is disposed.

In the example embodiment, the first lens can be disposed on the first light emitting diode ED1. A viewing angle of the area in which the first light emitting diode ED1 is disposed can correspond to a first value by the first lens. For example, the viewing angle of the area in which the first light emitting diode ED1 is disposed can be equal to or larger than the first value. The second lens can be disposed on the second light emitting diode ED2. A viewing angle of the area in which the second light emitting diode ED2 is disposed can correspond to a second value by the second lens. The second value can be smaller than the first value. For example, the viewing angle of the area in which the second light emitting diode ED2 is disposed can be equal to or smaller than the second value.

In the example embodiment, the area in which the first light emitting diode ED1 of the pixel circuit is disposed can have a viewing angle of a first value to supply light to a range corresponding to the front passenger seat and the driver seat next to the front passenger seat. The area in which the second light emitting diode ED2 is disposed can have a viewing angle of a second value to supply light to a range corresponding to the front passenger seat.

For example, contents (or images) provided through the first light emitting diode ED1 of the pixel PX can be shared by surrounding people which is adjacent to the user in the first direction. When the contents are provided through the first light emitting diode ED1, the contents are provided at a first viewing angle range which is wider than a second viewing angle range supplied by the second light emitting diode ED2 and this can be referred to as a first mode. Further, the contents provided by the second light emitting diode ED2 may not be shared by people around the user. When the contents are provided through the second light emitting diode ED2, the contents are provided at a second viewing angle range which is narrower than the first viewing angle range supplied by the first light emitting diode ED1 and this can be referred to as a second mode.

The third transistor T3 can be connected to at least one of the fifth transistor T5, the sixth transistor T6, the seventh transistor T7, and the capacitor Cstg.

For example, a first electrode of the third transistor T3 can be connected to a reference voltage line which supplies a reference voltage Vref. Further, the first electrode of the third transistor T3 can be connected to the fifth transistor T5 and the sixth transistor T6. A second electrode of the third transistor T3 can be connected to the seventh transistor T7 and the capacitor Cstg. A gate electrode of the third transistor T3 can be connected to an emission signal line which supplies an emission signal EM. The third transistor T3 can be turned on or off by the emission signal EM. Therefore, when the third transistor T3 is turned on, the reference voltage Vref can be applied to a first electrode of the capacitor Cstg.

The fourth transistor T4 can be connected to at least one of the driving transistor DT, the first transistor T1, the second transistor T2, and the capacitor Cstg.

For example, a first electrode of the fourth transistor T4 can be connected to the driving transistor DT and the capacitor Cstg. A second electrode of the fourth transistor T4 can be connected to the driving transistor DT, the first transistor T1, and the second transistor T2. A gate electrode of the fourth transistor T4 can be connected to the second scan line which supplies the second scan signal SCAN2. The fourth transistor T4 can be supplied with the second scan signal SCAN2 and can be turned on or turned off by the second scan signal SCAN2. Therefore, when the fourth transistor T4 is turned on, the gate electrode and the second electrode of the driving transistor DT are diode-connected to be connected as a diode.

The fifth transistor T5 can be connected to at least one of the first transistor T1, the third transistor T3, and the first light emitting diode ED1.

For example, a first electrode of the fifth transistor T5 can be connected to the third transistor T3 and a reference voltage line which supplies a reference voltage Vref. A second electrode of the fifth transistor T5 can be connected to the first transistor T1 and the first light emitting diode ED1. A gate electrode of the fifth transistor T5 can be connected to the second scan line. Therefore, the fifth transistor T5 can be supplied with the second scan signal SCAN2 and can be turned on or turned off by the second scan signal SCAN2. Therefore, when the fifth transistor T5 is turned on, the reference voltage Vref can be applied to the first light emitting diode ED1 (for example, an anode electrode of the first light emitting diode ED1).

The sixth transistor T6 can be connected to at least one of the second transistor T2, the third transistor T3, and the second light emitting diode ED2.

For example, a first electrode of the sixth transistor T6 can be connected to the third transistor T3 and a reference voltage line which supplies a reference voltage Vref. A second electrode of the sixth transistor T6 can be connected to the second transistor T2 and the second light emitting diode ED2. A gate electrode of the sixth transistor T6 can be connected to the second scan line. Therefore, the sixth transistor T6 can be supplied with the second scan signal SCAN2 and can be turned on or turned off by the second scan signal SCAN2. Therefore, when the sixth transistor T6 is turned on, the reference voltage Vref can be applied to the second light emitting diode ED2 (for example, an anode electrode of the second light emitting diode ED2).

The seventh transistor T7 can be connected to at least one of the third transistor T3 and the capacitor Cstg.

For example, a first electrode of the seventh transistor T7 can be connected to a data line which supplies a data voltage Vdata. A second electrode of the seventh transistor T7 can be connected to the third transistor T3 and the capacitor Cstg. A gate electrode of the seventh transistor T7 can be connected to the first scan line which supplies the first scan signal SCAN1. The seventh transistor T7 is supplied with the first scan signal SCAN1 and can be turned on or turned off by the first scan signal SCAN1. Therefore, when the seventh transistor T7 is turned on, the data voltage Vdata can be applied to the first electrode of the capacitor Cstg.

The first light emitting diode ED1 and the second light emitting diode ED2 can be connected to the low potential power line which supplies a low potential power voltage ELVSS. For example, a cathode electrode of the first light emitting diode ED1 and a cathode electrode of the second light emitting diode ED2 are connected to the low potential power line to be supplied with the low potential power voltage ELVSS. The low potential power voltage can be a ground voltage (for example, 0 V (volt)). For example, the cathode electrode of the first light emitting diode ED1 and the cathode electrode of the second light emitting diode ED2 are supplied with a voltage corresponding to the ground voltage, but are not limited thereto.

Figure 10:
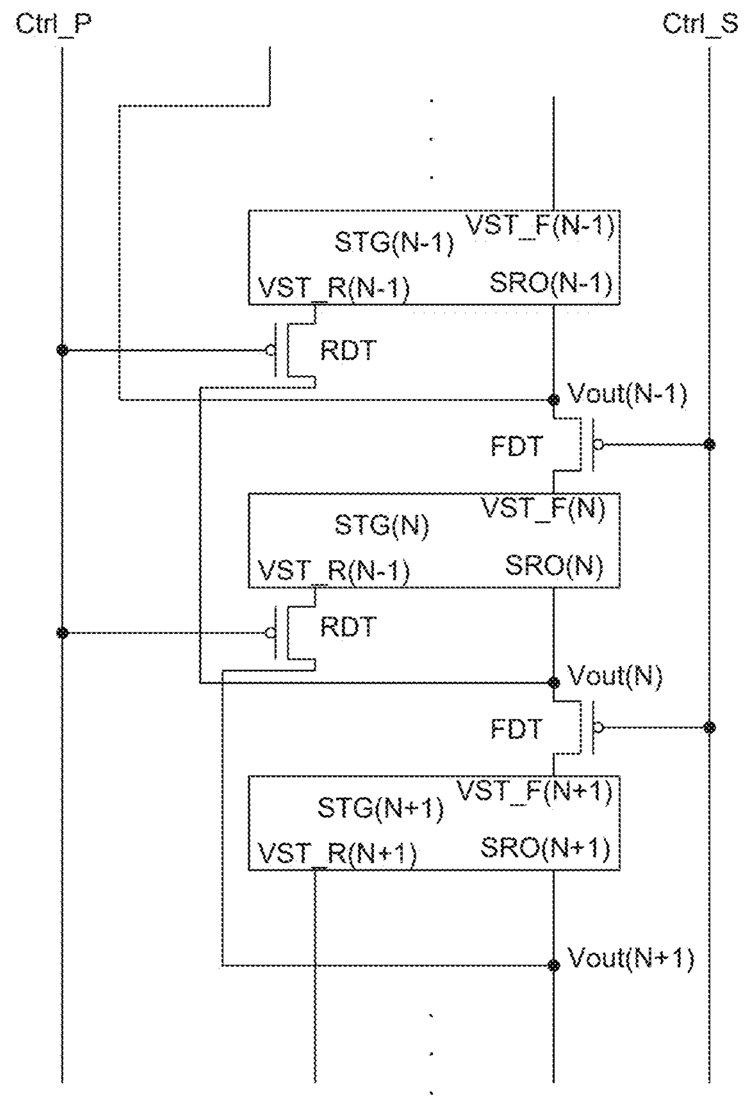
FIG. 10 is a block diagram of a gate driver of a display apparatus according to still another example embodiment of the present disclosure.
Figure 11:
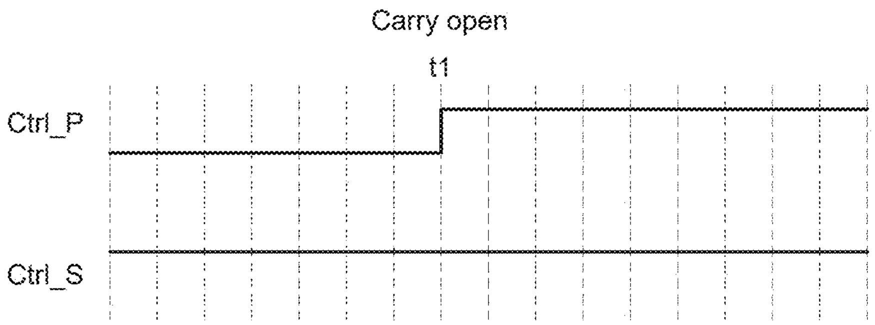
FIG. 11 is a waveform diagram of a control signal for explaining an operation of a display apparatus according to still another example embodiment of the present disclosure.
Figure 12:
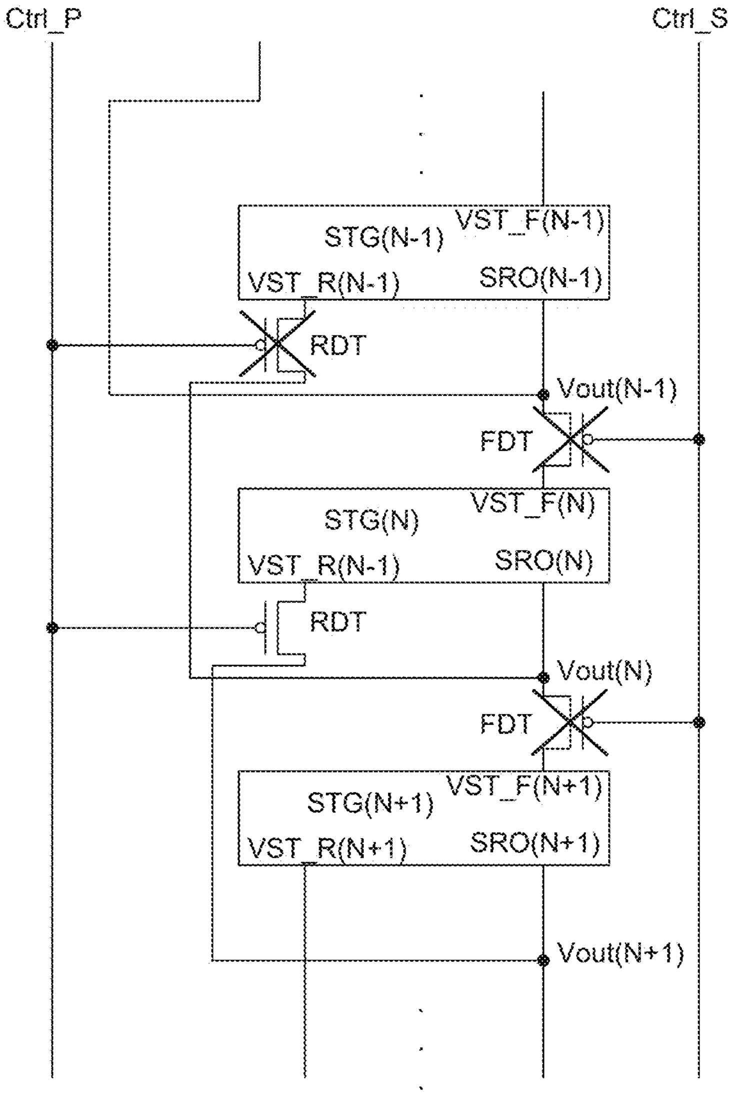
FIG. 12 is a block diagram of a gate driver for explaining an operation of a display apparatus according to still another example embodiment of the present disclosure.
Figure 13:
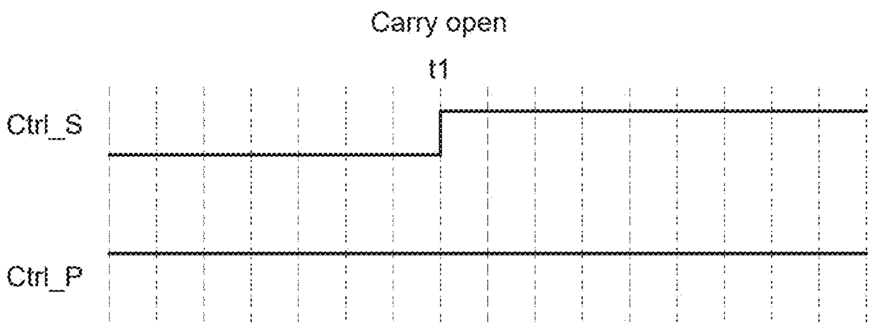
FIG. 13 is a waveform diagram of a control signal for explaining an operation of a display apparatus according to still another example embodiment of the present disclosure.
Figure 14:
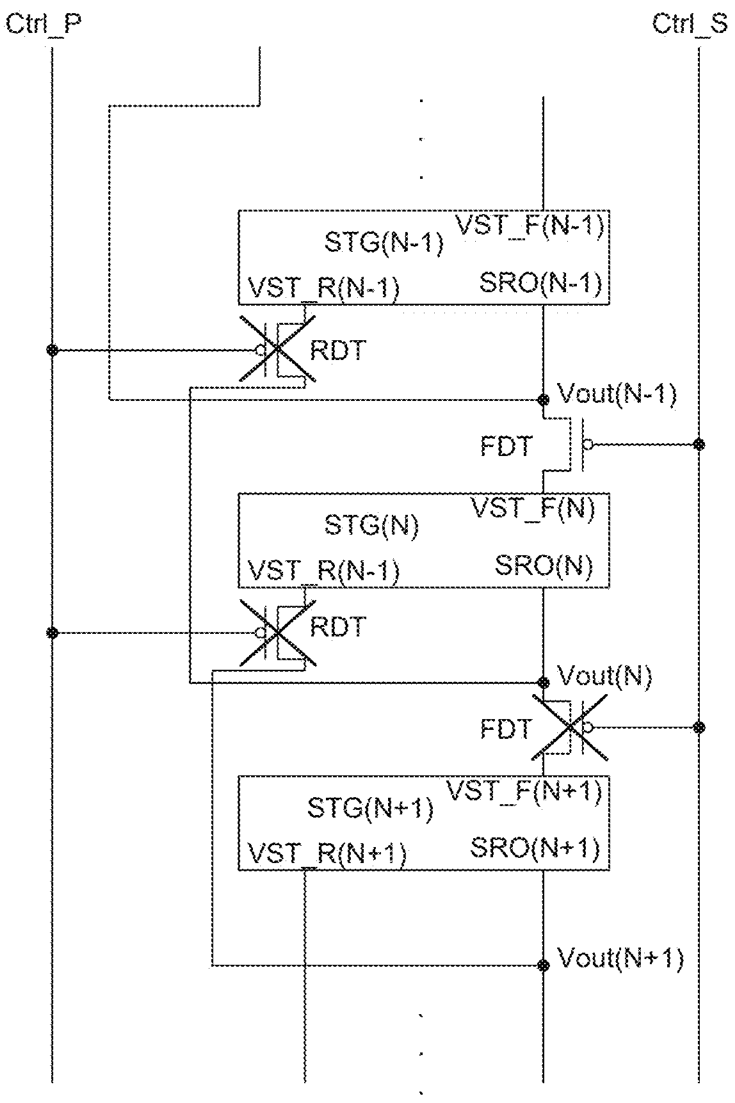
FIG. 14 is a block diagram of a gate driver for explaining an operation of a display apparatus according to still another example embodiment of the present disclosure.

FIG. 10 is a block diagram of a gate driver of a display apparatus according to still another example embodiment of the present disclosure. FIG. 11 is a waveform diagram of a control signal for explaining an operation of a display apparatus according to still another example embodiment of the present disclosure. FIG. 12 is a block diagram of a gate driver for explaining an operation of a display apparatus according to still another example embodiment of the present disclosure. FIG. 13 is a waveform diagram of a control signal for explaining an operation of a display apparatus according to still another example embodiment of the present disclosure. FIG. 14 is a block diagram of a gate driver for explaining an operation of a display apparatus according to still another example embodiment of the present disclosure.

In FIG. 10, the remaining configurations excluding a plurality of first control transistors FDT and a plurality of second control transistors RDT are the same as that in FIG. 3 so that a detailed description will be omitted. In the display apparatus 300 according to still another example embodiment of the present disclosure, as illustrated in FIG. 6, the active area AA can be divided into a plurality of active areas AA1 and AA2 and a plurality of pixels P disposed in the plurality of active areas AA1 and AA2 can be driven in a wide field-of-view mode (share mode) or a narrow field-of-view mode (private mode).

Referring to FIG. 10, the plurality of first control transistors FDT and the plurality of second control transistors RDT can be connected between the plurality of stages STG.

The plurality of first control transistors FDT can connect forward input terminals VST_F(N−1), VST_F(N), and VST_F(N+1) and output terminals SRO(N−1), SRO(N), and SRO(N+1) of the plurality of stages STG in response to a first control signal Ctrl_S. For example, gate electrodes of the plurality of first control transistors FDT can be connected to the first control signal line to which the first control signal Ctrl_S is applied. Therefore, when the first control signal Ctrl_S is a low level, the plurality of first control transistors FDT can be turned on. Accordingly, the plurality of stages STG(N) and STG(N+1) can operate by connecting forward input terminals VST_F(N) and VST_F(N+1) to output terminals SRO(N−1) and SRO(N) of previous stages STG(N−1) and STG(N) to input the output signals Vout(N−1) and Vout(N) as start signals.

The plurality of second control transistors RDT can connect backward input terminals VST_R(N−1), VST_R(N), and VST_R(N+1) and output terminals SRO(N−1), SRO(N), and SRO(N+1) of the plurality of stages STG in response to the second control signal Ctrl_P. For example, gate electrodes of the plurality of second control transistors RDT can be connected to the second control signal line to which the second control signal Ctrl_P is applied. Therefore, when the second control signal Ctrl_P is a low level, the plurality of second control transistors RDT can be turned on. Accordingly, the plurality of stages STG(N) and STG(N−1) can operate by connecting backward input terminals VST_R(N) and VST_R(N−1) to output terminals SRO(N) and SRO(N+1) of previous stages STG(N) and STG(N+1) to input the output signals Vout(N) and Vout(N+1) as start signals.

Referring to FIGS. 11 and 12, a first time t1 can correspond to a carry open line CL of FIG. 6. A voltage level of the first control signal Ctrl_S or the second control signal Ctrl_P is changed at the first time t1. For example, when the second active area AA2 is driven in the narrow field-of-view mode, the second control signal Ctrl_P is changed from a low level voltage to a high level voltage at the first time t1 and the first control signal Ctrl_S can be maintained as a high level voltage.

For example, when the second stage STG(N) corresponds to the carry open line CL, a low level of the second control signal Ctrl_P is input until the first time t1 and a high level of the second control signal Ctrl_P can be input after the first time t1. Further, the first control signal Ctrl_S can be input as a high level of the signal. In this case, the plurality of first control transistors FDT is turned off and the second control transistor RDT connected between the stages from the last stage STG(N+1) to the second stage STG(N) is turned on by the low level of the second control signal Ctrl_P. Further, the second control transistor RDT connected between the stages from the second stage STG(N) to the first stage STG(N−1) can be turned off by the high level of the second control signal Ctrl_P.

Therefore, output signals Vout(N+1) and Vout(N) output from the stages STG(N−1), STG(N), and STG(N+1) can be supplied as a wide field-of-view control signal Ss of the pixel circuit.

Referring to FIGS. 13 and 14, when the first active area AA1 is driven in the wide field-of-view mode, the first control signal Ctrl_S is changed from the low level voltage to the high level voltage at the first time t1 and the second control signal Ctrl_P can be maintained as the high level voltage.

For example, when the second stage STG(N) corresponds to the carry open line CL, a low level of the first control signal Ctrl_S is input until the first time t1 and a high level of the first control signal Ctrl_S can be input after the first time t1. Further, the second control signal Ctrl_P can be input as a high level of the signal. In this case, the plurality of second control transistors RDT is turned off and the first control transistor FDT connected between the stages from the first stage STG(N−1) to the second stage STG(N) is turned on by the low level of the first control signal Ctrl_S. Further, the first control transistor FDT connected between the stages from the second stage STG(N) to the last stage STG(N+1) can be turned off by the high level of the second control signal Ctrl_P.

Therefore, output signals Vout(N+1) and Vout(N) output from the stages STG(N−1), STG(N), and STG(N+1) can be supplied as a narrow field-of-view control signal Ps of the pixel circuit. Accordingly, the display apparatus 300 according to still another example embodiment of the present disclosure divides the active area AA of the display panel PN to be driven in a wide field-of-view mode or a narrow field-of-view mode for every active area AA.

When the display apparatus divides the display panel into a plurality of active areas to be driven in different modes, there is a problem in that a control signal line connected to each active area corresponding to a predetermined active area is physically cut to connect a separate line. Further, there is a problem in that an area of the divided active areas should be fixed to a predetermined area.

Therefore, in the display apparatus 300 according to still another example embodiment of the present disclosure, a plurality of first control transistors FDT and a plurality of second control transistors RDT are connected between the plurality of stages STG. The operations of the first control transistor FDT and the second control transistor RDT can be controlled by the first control signal Ctrl_S and the second control signal Ctrl_P. Some of the plurality of stages STG can be controlled to output an output signal in a forward direction and the others of the plurality of stages are controlled to output an output signal in a backward direction, according to the first control signal Ctrl_S and the second control signal Ctrl_P. Accordingly, the first control signal Ctrl_S and the second control signal Ctrl_P are controlled to control areas of the first active area AA1 and the second active area AA2 in the active area AA. Further, the first active area AA1 and the second active area AA2 can be controlled to be driven in the wide field-of-view mode or the narrow field-of-view mode.

A display apparatus according to the example embodiments of the present disclosure can also be described as follows:

A display apparatus according to an example embodiment of the present disclosure includes a display panel including an active area in which a plurality of pixels is disposed and a non-active area which encloses the active area and a gate driver which outputs an output signal in a forward direction or a backward direction according to a scan mode, the gate driver includes a plurality of stages and a scan direction controller which is connected between the plurality of stages to transmit the output signal output from an n-th stage to any one of an n−1-th stage or an n+1-th stage according to the scan mode.

The plurality of stages can include a pull-down unit connected to a Q node, a pull-up unit connected to a QB node, a Q node controller which controls a voltage of the Q node according to the scan mode and a QB node controller which controls a voltage of the QB node according to the scan mode.

The Q node controller can control a voltage of the Q node according to a clock signal, an output signal of an n−1-th stage, an output signal of an n+1-th stage, a first control signal, and a second control signal.

The Q node controller can include a 1-1-th transistor connected between a forward input terminal and a Q1 node, a 1-2-th transistor connected between the Q1 node and the Q node, a 1-3-th transistor connected between a clock signal line and the 1-2-th transistor, a 1-4-th transistor connected between a backward input terminal and a Q2 node, a 1-5-th transistor connected between the Q2 node and the Q node and a 1-6-th transistor connected between the clock signal line and the 1-5-th transistor.

The QB node controller can control a voltage of the Q node according to a clock signal, an output signal of an n−1-th stage, an output signal of an n+1-th stage, a first control signal, and a second control signal.

The QB node controller can include a 2-1-th transistor connected between a QB1 node and a gate high signal line, a 2-2-th transistor connected between the QB1 node and the gate high signal line, a 2-3-th transistor connected between a clock signal line and the QB node, a 2-4-th transistor connected between the gate high signal line and the QB node and a first capacitor which is connected between the clock signal line and the QB1 node.

The QB node controller can further include a second capacitor connected between the gate high signal line and the QB node.

The scan direction controller can include a first control transistor which is connected between an output terminal of the n-th stage and an input terminal of the n−1-th stage, among the plurality of stages and a second control transistor which is connected between an output terminal of the n-th stage and an input terminal of the n+1-th stage, among the plurality of stages.

A gate electrode of the first control transistor can be connected to a first control signal line to which a first control signal is supplied, a source electrode can be connected to an output terminal of the n-th stage, and a drain electrode can be connected to an input terminal of the n−1-th stage and a gate electrode of the second control transistor can be connected to a second control signal line to which a second control signal is supplied, a source electrode can be connected to an output terminal of the n-th stage, and a drain electrode can be connected to an input terminal of the n+1th stage.

When the first control signal is a high level, the second control signal can be a low level and when the first control signal is a low level, the second control signal can be a high level.

The active area can be include a first active area and a second active area and the first control signal and the second control signal can be changed from a high level to a low level or from a low level to a high level, in accordance with a boundary line between the first active area and the second active area.

The first active area and the second active area can have different driving frequencies.

Although the example embodiments of the present disclosure have been described in detail with reference to the accompanying drawings, the present disclosure is not limited thereto and can be embodied in many different forms without departing from the technical concept of the present disclosure. Therefore, the example embodiments of the present disclosure are provided for illustrative purposes only but not intended to limit the technical concept of the present disclosure. The scope of the technical concept of the present disclosure is not limited thereto.

Therefore, it should be understood that the above-described example embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display apparatus, comprising:
- a display panel including an active area in which a plurality of pixels is disposed and a non-active area adjacent to the active area; and
- a gate driver configured to output an output signal in a forward direction or a backward direction according to a scan mode, wherein the gate driver includes:
- a plurality of stages; and
- a scan direction controller connected between the plurality of stages to transmit the output signal output from an n-th stage to any one of an n−1-th stage or an n+1-th stage according to the scan mode, where n is an integer, wherein the plurality of stages includes:
- a pull-down unit connected to a Q node;
- a pull-up unit connected to a QB node;
- a Q node controller configured to control a voltage of the Q node according to the scan mode; and
- a QB node controller configured to control a voltage of the QB node according to the scan mode, and wherein the Q node controller includes:
- a 1-1-th transistor connected between a forward input terminal and a Q1 node;
- a 1-2-th transistor connected between the Q1 node and the Q node;
- a 1-3-th transistor connected between a clock signal line and the 1-2-th transistor;
- a 1-4-th transistor connected between a backward input terminal and a Q2 node;
- a 1-5-th transistor connected between the Q2 node and the Q node; and
- a 1-6-th transistor connected between the clock signal line and the 1-5-th transistor.

2. The display apparatus according to claim 1, wherein the Q node controller controls a voltage of the Q node according to a clock signal, an output signal of an n−1-th stage, an output signal of an n+1-th stage, a first control signal, and a second control signal.

3. The display apparatus according to claim 1, wherein the QB node controller controls a voltage of the Q node according to a clock signal, an output signal of an n−1-th stage, an output signal of an n+1-th stage, a first control signal, and a second control signal.

4. The display apparatus according to claim 1, wherein the QB node controller includes:
- a 2-1-th transistor connected between a QB1 node and a gate high signal line;
- a 2-2-th transistor connected between the QB1 node and the gate high signal line;
- a 2-3-th transistor connected between a clock signal line and the QB node;

a 2-4-th transistor connected between the gate high signal line and the QB node; and a first capacitor connected between the clock signal line and the QB1 node.

5. The display apparatus according to claim 4, wherein the QB node controller further includes a second capacitor connected between the gate high signal line and the QB node.

6. The display apparatus according to claim 1, wherein the scan direction controller includes:

a first control transistor connected between an output terminal of the n-th stage and an input terminal of the n+1-th stage, among the plurality of stages; and a second control transistor connected between the output terminal of the n-th stage and an input terminal of the n−1-th stage, among the plurality of stages.

7. The display apparatus according to claim 6, wherein a gate electrode of the first control transistor is connected to a first control signal line to which a first control signal is supplied, a source electrode of the first control transistor is connected to the output terminal of the n-th stage, and a drain electrode of the first control transistor is connected to the input terminal of the n+1-th stage and wherein a gate electrode of the second control transistor is connected to a second control signal line to which a second control signal is supplied, a source electrode of the second control transistor is connected to an output terminal of the n-th stage, and a drain electrode of the second control transistor is connected to an input terminal of the n−1-th stage.

8. The display apparatus according to claim 7, wherein when the first control signal is at a high level, the second control signal is at a low level and when the first control signal is at a low level, the second control signal is at a high level.

9. The display apparatus according to claim 7, wherein the active area includes a first active area and a second active area and wherein the first control signal and the second control signal are changed from a high level to a low level or from a low level to a high level, in accordance with a boundary line between the first active area and the second active area.

10. The display apparatus according to claim 9, wherein the first active area and the second active area have different driving frequencies.

* * * * *